US012363377B2

(12) United States Patent
Mowrer et al.

(10) Patent No.: US 12,363,377 B2
(45) Date of Patent: *Jul. 15, 2025

(54) METHODS, ARTICLES OF MANUFACTURE, AND APPARATUS TO EDIT TUNING DATA COLLECTED VIA AUTOMATED CONTENT RECOGNITION

(71) Applicant: The Nielsen Company (US), LLC, New York, NY (US)

(72) Inventors: Samantha M. Mowrer, La Grange, IL (US); Fatemehossadat Miri, Chicago, IL (US); Balachander Shankar, Tampa, FL (US); David J. Kurzynski, Elgin, IL (US); Hariprasath Balasubramani, Odessa, FL (US); Sharan Senthilvasan, Tampa, FL (US); Lisa G. Rossi, Lutz, FL (US); Mike Anderson, Chicago, IL (US); Abhignya Goje, Chicago, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,686

(22) Filed: Nov. 24, 2023

(65) Prior Publication Data

US 2024/0244289 A1 Jul. 18, 2024

Related U.S. Application Data

(63) Continuation of application No. 17/877,589, filed on Jul. 29, 2022, now Pat. No. 11,863,816.

(Continued)

(51) Int. Cl.
*H04N 21/25* (2011.01)
*H04N 21/258* (2011.01)
(Continued)

(52) U.S. Cl.
CPC . *H04N 21/44008* (2013.01); *H04N 21/25841* (2013.01); *H04N 21/25866* (2013.01);
(Continued)

(58) Field of Classification Search
None
See application file for complete search history.

(56) References Cited

U.S. PATENT DOCUMENTS

2019/0045264 A1* 2/2019 Burg ...................... G06Q 30/02
2021/0099757 A1* 4/2021 Whitely ............. H04N 21/4532

* cited by examiner

*Primary Examiner* — Cai Y Chen

(57) ABSTRACT

Methods, apparatus, systems, and articles of manufacture are disclosed for editing tuning data collected via automated content recognition. Examples include determining whether a time conflict exists between first tuning data corresponding to a first tuning event and second tuning data corresponding to a second tuning event. Examples also include that, in response to determining that the time conflict exists, creating a third tuning event based on the first tuning data, the second tuning data, and one or more criteria. Examples also include that modifying at least one of the first tuning event or the second tuning event based on the third tuning event. Examples also include that crediting a media presentation by the presentation device based on edited tuning data, the edited tuning data including the first modified tuning event, the second modified tuning event, and the third tuning event.

20 Claims, 15 Drawing Sheets

Related U.S. Application Data

(60) Provisional application No. 63/300,629, filed on Jan. 18, 2022.

(51) Int. Cl.
*H04N 21/44* (2011.01)
*H04N 21/442* (2011.01)
*H04N 21/4425* (2011.01)
*H04N 21/45* (2011.01)

(52) U.S. Cl.
CPC ..... *H04N 21/442* (2013.01); *H04N 21/44204* (2013.01); *H04N 21/44222* (2013.01); *H04N 21/4425* (2013.01); *H04N 21/4524* (2013.01)

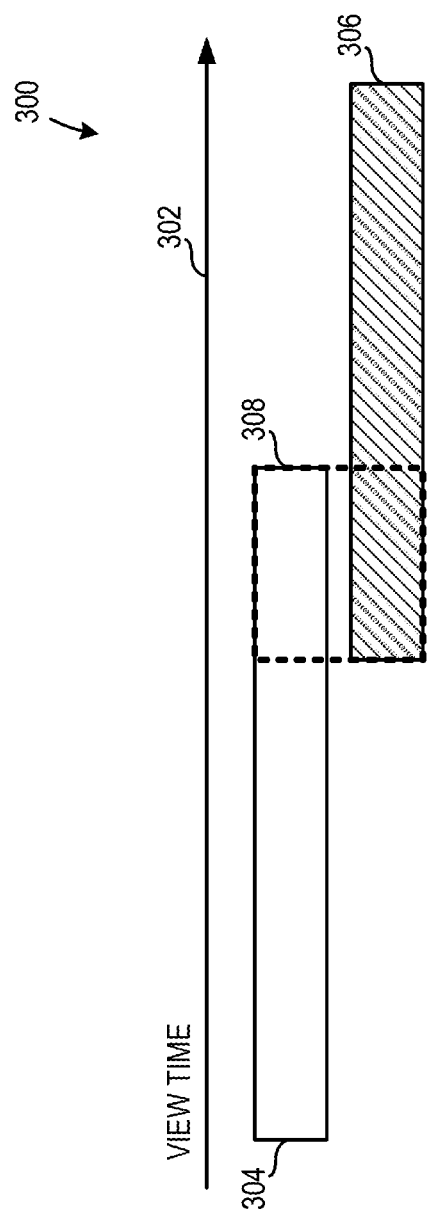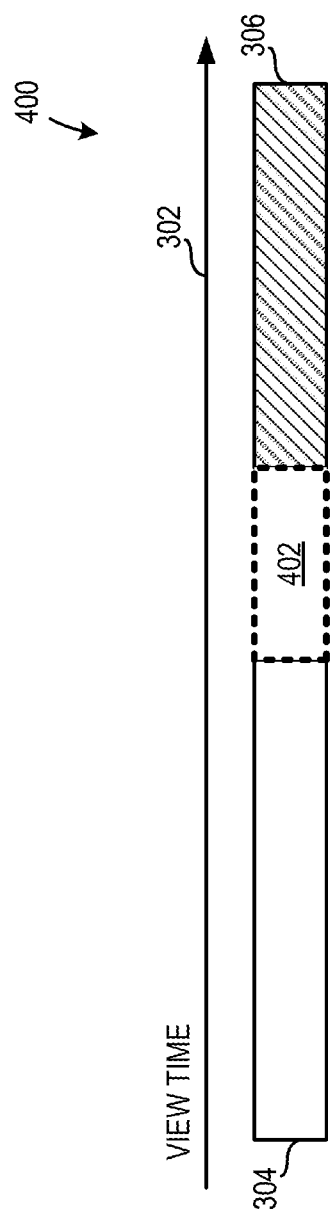

METHODS, ARTICLES OF MANUFACTURE, AND APPARATUS TO EDIT TUNING DATA COLLECTED VIA AUTOMATED CONTENT RECOGNITION

CROSS REFERENCE TO RELATED APPLICATIONS

This disclosure is a continuation of U.S. patent application Ser. No. 17/877,589, (now U.S. Pat. No. 11,863,816), filed Jul. 29, 2022, which claims priority to U.S. Provisional Pat. App. No. 63/300,629, filed Jan. 18, 2022, each of which is hereby incorporated by reference herein in its entirety.

FIELD OF THE DISCLOSURE

This disclosure relates generally to data collection and, more particularly, to methods, articles of manufacture, and apparatus to edit tuning data collected via automated content recognition data.

BACKGROUND

In recent years, some presentation devices (e.g., smart televisions (TVs), streaming media players, etc.) use automated content recognition (ACR) to monitor and detect media being displayed on the presentation device without relying on user input(s). To collect tuning data and/or content metadata via ACR, a portion of the media is obtained from a media file or captured during the stream. The presentation device may detect identifier(s) (e.g., a fingerprint and/or a digital watermark) of the media clip and transmit the identifier(s) to a computing device (e.g., a server, back office facility, cloud computing center, etc.). The computing device compares the identifier(s) against databases of recorded media and corresponding fingerprints and/or watermarks to identify the presented media. If there is a match between the presented media and known recorded media, the computing device can obtain metadata corresponding to the media for transmission to the user, a manufacturer of the streaming device, and/or a data aggregator. The streaming device and/or another device (e.g., metering device, set top box, Wi-Fi router, etc.) may collect tuning data corresponding to the media to provide viewing related information to accompany the content metadata for generation of tuning events by the computing device.

BRIEF DESCRIPTION OF THE DRAWINGS

FIG. 3 is an illustration of an example view conflict between two example tuning events.

FIG. 4 is an illustration of an example view conflict resolution based on edits performed on the example view conflict illustrated in FIG. 3.

In general, the same reference numbers will be used throughout the drawing(s) and accompanying written description to refer to the same or like parts.

Figure 1:
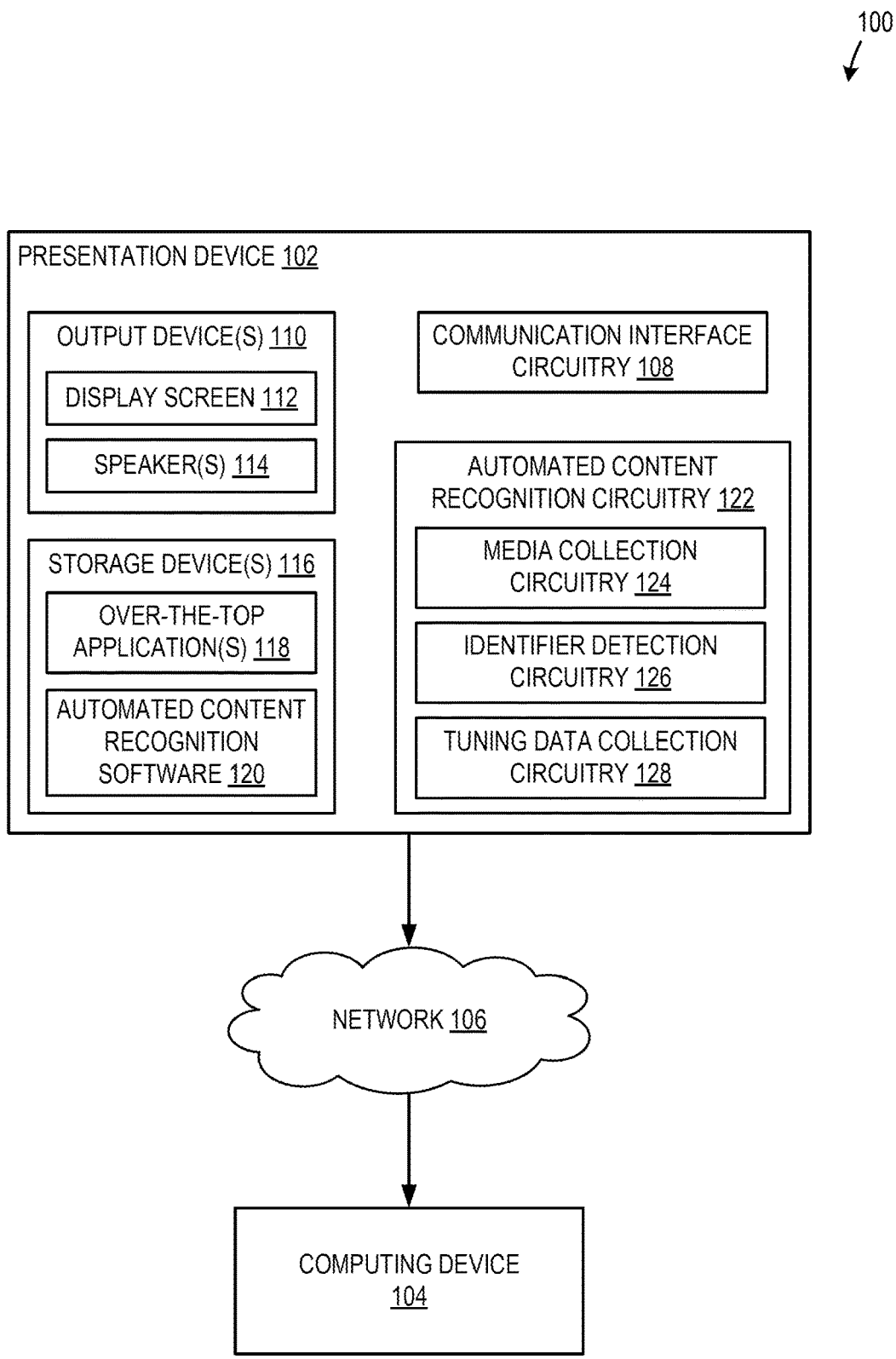
FIG. 1 is an illustration of a first example system for collecting tuning data via ACR.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

As streaming media becomes more prevalent, some monitoring technologies have been developed to automatically detect streaming digital media content (e.g., television series, episodes, programs, films, online videos, etc.) being presented and/or watched. Automatic content recognition (ACR) uses fingerprinting (e.g., acoustic fingerprinting and/or video fingerprinting) and digital watermarking to identify media presented on a presentation device capable of streaming content (e.g., a smart television (TV), a streaming media player, mobile device, and/or another ACR-enabled device). The presentation device can collect tuning data via ACR to understand viewing information and behaviors of panelist(s) and/or household(s) associated with the digital media content. The term "tuning data" is used herein to describe data obtained using ACR that indicate viewing conditions related to the media, which may include geographic information of the presentation device. The tuning data can include a station code, an application service identification (ID), a view time, a credit time, a geographic location, such as a designated market area (DMA), etc. As used herein, the term "tuning event" refers to tuning data associated with a viewing period between remote activity (e.g. channel change, play, pause, rewind, etc.), not including volume change. A tuning event may correspond to a program (e.g., a television episode, an online video, a film, etc.) or a portion of the program. A computing device (e.g., a server, a back office facility, a cloud computing center, etc.) can obtain content metadata corresponding to the tuning data of the media being viewed to generate the tuning event. This "content metadata" can include a content title, a channel ID, a network ID (e.g., a content delivery network (CDN), a multi-channel network (MCN), etc.), etc., and is included with the tuning data of the tuning event.

Some shortcomings of ACR-collected tuning data can include unidentified and/or misidentified media. The tuning data can include illogical, overlapping, and/or conflicting view/credit start/end times. A portion of the tuning data collected via ACR can be obfuscated, and some detailed content metadata can be missing. In some examples, the computing device is unable to attribute viewing to the correct station using ACR when the same advertisement (ad) or program airs at multiple times on multiple networks, or when aired simultaneously on multiple networks. In some other examples, the computing device is unable to identify application information of the media because ACR software on the presentation device may shut off during use of the application based on agreements and/or licenses between media provider(s), a manufacturer of the presentation device, and/or organizations that own/operate the computing device. When the ACR tuning data includes errors, such as missing or illogical data, audience measurement entities can incorrectly assess the viewing patterns of panelists/households regarding advertisements, television shows, sporting events, etc. Additionally or alternatively, a computing device (e.g., a server, a computing facility, a workstation, etc.) that performs tuning measurements and/or analyses to evaluate, model, and/or predict audience viewing behaviors can spend extra processing time and/or power to parse through unclean and illogical ACR tuning data. Furthermore, when the ACR tuning data includes errors, the computing device may be unable to credit the tuning event to the proper media presentation, which can cause a misrepresentation of the ratings and/or audience viewing measurements and/or cause an organization of the computing device to provide advertisement or viewing information incorrectly or incompletely to third parties.

In examples disclosed herein, a computing device (e.g., a server, a back office computing facility, a central cloud computing station, etc.) that receives tuning data collected via ACR ("ACR data") applies a set of tuning data editing rules to standardize, clean, and/or otherwise edit the tuning data that is incomplete, illogical, and/or conflicting. In some such examples, the computing device applies the tuning data editing rules to clean the tuning data and to make the tuning data usable for media crediting and/or audience measurement. Thus, the computing device can use the clean tuning data to measure audiences, analyze tuning events, and/or credit media presentations to tuning events more efficiently and comprehensively without spending extra processing time and/or power parsing through illogical, unusable, and/or inconsistent data.

FIG. 1 is an illustration of an example system 100 for collecting tuning data via ACR. The example system 100 illustrated in FIG. 1 includes an example presentation device 102 connected to an example computing device 104 via an example network 106. The example computing device 104 can be implemented by one or more servers, data processing centers, cloud computing platforms, etc. The example presentation device 102 of the system 100 includes example communication interface circuitry 108, example output device(s) 110, such as an example display screen 112 and example speakers(s) 114, example storage device(s) 116, example over-the-top application(s) (OTT app(s)) 118, example automated content recognition software 120, example automated content recognition circuitry 122, example media collection circuitry 124, example identifier detection circuitry 126, and example tuning data collection circuitry 128. The example presentation device 102 illustrated in FIG. 1 collects the tuning data, samples the streaming media, and/or detects a unique identifier of the media (e.g., a fingerprint and/or a watermark) via ACR hardware and/or software (e.g., the OTT app(s) 118, the ACR software 120, and/or the ACR circuitry 122). The presentation device 102 can transmit the unique identifier and the tuning data to the computing device 104 via the network 106 for identification of the media, generation of associated tuning event(s), and editing of the tuning data and tuning event(s).

The example system 100 illustrated in FIG. 1 includes the presentation device 102 to stream the media for display to an audience (e.g., panelist(s) and/or member(s) of the household). The example presentation device 102 illustrated in FIG. 1 can be a smart TV with ACR software (e.g., ACR software 120) running in the background of an operating system. Additionally or alternatively, the presentation device 102 includes installed OTT application services (e.g., OTT app(s) 118) used to stream the media via the example network 106 and with ACR software included in the application service. In some examples, the presentation device 102 is a hardware digital streaming device, a gaming console, or other ACR-enabled device connected to a television, projector, monitor, or other display device and in communication with the example network 106. In some examples, the presentation device 102 is a mobile device capable of streaming digital media and monitoring the content via ACR. The example presentation device 102 is capable of displaying media, capturing tuning data of a tuning event via ACR hardware and/or software, and sending the tuning data of the tuning event to the computing device 104 for standardization, cleaning, and/or editing. The example computing device 104 is described in greater detail below in reference to FIG. 2.

The example system 100 illustrated in FIG. 1 includes the network 106 to enable the presentation device 102 to transmit the tuning data to the computing device 104 for processing and editing. The example network 106 may facilitate a wired (e.g., a coaxial, a fiber optic, etc.) or a wireless (e.g., a local area network, a wide area network, etc.) connection between the presentation device 102 and the computing device 104. In some examples, the presentation device 102 uses the communication interface circuitry 108 (e.g., a network interface controller, etc.) to transmit the tuning data to another device and/or location. Once uploaded to the computing device 104 via the network 106, the computing device 104 may identify the media based on the identifier that the presentation device 102 detects. After receiving the tuning data, the example computing device 104 can also transmit the edited or raw tuning data to a third party (e.g., a device manufacturer, an advertisement agency, a data aggregator, etc.) for further editing, processing, and/or measuring.

The presentation device 102 of the example system 100 illustrated in FIG. 1 includes the communication interface circuitry 108 to communicate information between the presentation device 102, the network 106, the computing device 104, the display screen 112, etc. In some examples, the communication interface circuitry 108 is a network interface controller that connects the presentation device 102 with the network 106 such that data can be input and/or output to and/or from the presentation device 102. In some examples, the output device(s) is/are external to the presentation device, and the communication interface circuitry 108 establishes wired (e.g., USB, etc.) or wireless (e.g., Bluetooth, etc.) connection(s) with output device(s) 110 (e.g., the display screen 112, the speaker(s) 114, projector(s), etc.) and sends signals that the presentation device 102 generates (e.g., using processing circuitry (e.g., central processing unit, ASIC, FPGA, etc.)).

The presentation device 102 of the example system 100 of FIG. 1 includes the output device(s) 110 to visually and/or acoustically display the media to an audience. The example output device(s) 110 includes a display screen 112 to present graphical content to a user of the presentation device 102. In some examples, the display screen 112 is a touch screen that enables a user to interact with data presented on the display screen 112 via a stylus and/or one or more fingers of the user. Additionally or alternatively, the user can interact with data presented on the display screen 112 via user input device(s) such as a remote controller, a keyboard, a mouse, touch pad, etc. The example output device(s) 110 includes the speaker (s) 114 to provide audible outputs to the user of the presentation device 102.

The example system 100 of FIG. 1 includes the storage device(s) 116 to save and provide access to the OTT app(s) 118 (e.g., Netflix®, Hulu®, YouTube®, YouTube TV®, etc.) and/or ACR software 120 installed on the presentation device 102. In some examples, the ACR software 120 is installed on an operating system of the presentation device 102 to run in the background and to monitor tuning events of the OTT app(s) 118 or other applications and/or services running on the presentation device 102. In some examples, the ACR software 120 is included with the OTT app(s) 118 and runs on the presentation device 102 concurrently with the OTT app(s) 118. The example storage device(s) 116 can include volatile memory (e.g., dynamic random access memory, static random access memory, etc.), non-volatile memory (e.g., flash memory, solid-state drives, read-only memory, etc.), and/or mass storage device(s) (e.g., tape libraries, RAID systems, holographic memory, computer drives, etc.).

The presentation device 102 of the example system 100 of FIG. 1 includes the ACR circuitry 122 to collect the tuning data of the tuning event via ACR. The ACR circuitry 122 of FIG. 1 can be processor circuitry such as a central processing unit executing instructions. Additionally or alternatively, the ACR circuitry 122 of FIG. 1 can be an ASIC and/or an FPGA structured to perform operations corresponding to the instructions. It should be understood that some or all of the ACR circuitry 122 can, thus, be instantiated at the same or different times. Some or all of the ACR circuitry 122 can be instantiated, for example, in one or more threads executing concurrently on hardware and/or in series on hardware. Moreover, in some examples, one or more virtual machines and/or containers executing on the microprocessor can implement some or all of the ACR circuitry 122.

The example system 100 of FIG. 1 includes the media collection circuitry 124 to obtain a sample of the media to be used for detection of the unique identifier of the media. In some examples, the media collection circuitry 124 records a portion (e.g., 10 seconds, 30 seconds, etc.) of the presented video and/or audio. In some examples, the media collection circuitry 124 obtains a portion of the media file from a database in which the media is stored and retrieved when the user of the presentation device selects the media for viewing. The media collection circuitry 122 performs preprocessing techniques (e.g., down sampling, down scaling, source code translation, etc.) based on algorithm(s) that the identifier detection circuitry 126 executes to detect a unique identifier for the media.

The example system 100 of FIG. 1 includes the identifier detection circuitry 126 to identify, detect, and/or recognize the unique identifier of the media for comparison against a plurality of identifiers stored in a database. The example identifier detection circuitry 126 can input the media clip into an executable algorithm for detecting an acoustic fingerprint, a visual fingerprint, a watermark, etc. and output the detected identifier of the media. In some examples, the identifier detection circuitry 126 identifies fingerprints and/or signatures that are impervious to degradation (e.g., audio distortion, resizing, dropped frames, etc.) that may occur during compression and that affect an ability of the identifier to be compared to other known identifiers. In some examples, the identifier detection circuitry 126 identifies data in the video and/or audio data of the media. In some examples, the identifiers/watermarks are detectable using specialized software and/or after using an authorization code to uncover the identifier(s).

The presentation device 102 of the example system 100 of FIG. 1 includes the tuning data collection circuitry 128 to gather data related to the presentation of the media for media crediting and/or audience measurement purposes. The example tuning data collection circuitry 128 can communicate with the OTT app(s) 118, the ACR software 120, and/or other software and/or applications on the presentation device 102 to detect the station code, the application service ID, the view times, the credit times, and/or the DMA of the tuning event(s).

In the examples disclosed herein, the station code can be an identification for a specific television broadcasting station that is streaming the media or can be an identification for a group of stations, such as network affiliates, independent broadcast, public broadcasting stations, ad-supported cable, all other tuning (AOT), etc. The example tuning data collection circuitry 128 can credit the station code as AOT if the station code is unable to be identified. In the examples disclosed herein, the application service ID that the tuning data collection circuitry 128 obtains corresponds to a proprietary application service. As used herein, a proprietary application service is a provider-owned application service that can be used to stream media content that the same provider also distributes.

As used herein, the "view time" of the tuning event refers to the time during which the media is streaming on the presentation device 102. As used herein, the "credit time" of the tuning event refers to the time during which the media airs over the network 106 or another delivery network. For example, a station may broadcast a program from 12:00 pm to 1:00 pm, and a user of the presentation device 102 may record the program and subsequently view the program from 8:00 pm to 9:00 pm. In this example, the credit time would include a credit start time of 12:00 pm and a credit end time of 1:00 pm, and the view time would include a view start time of 8:00 pm and a view end time of 9:00 pm, assuming that no remote actions (e.g., pause, rewind, fast-forward, etc.) occurred during the viewing.

Figure 2:
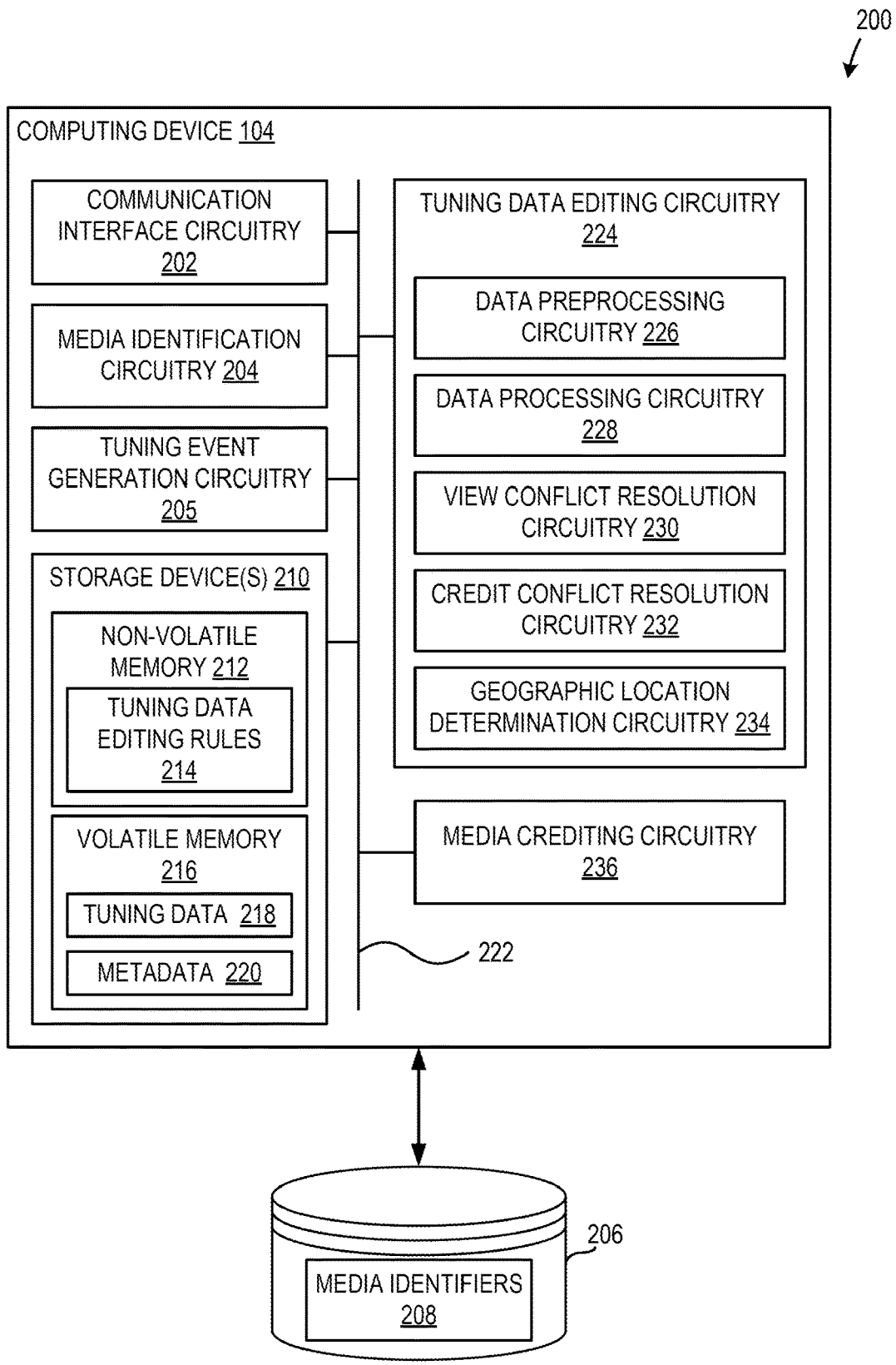
FIG. 2 is a block diagram of a second example system for editing the tuning data collected via ACR.

FIG. 2 is an illustration of an example system 200 for standardizing, cleaning, and/or otherwise editing the tuning data collected via ACR by the presentation device 102 of FIG. 1. Processor circuitry, such as a central processing unit executing instructions, can instantiate (e.g., create an instance of, bring into being for any length of time, materialize, implement, etc.) the computing device 104 of FIG. 2. Additionally or alternatively, an ASIC or an FPGA structured to perform operations corresponding to the instructions can instantiate (e.g., create an instance of, bring into being for any length of time, materialize, implement, etc.) the computing device 104 of FIG. 2. It should be understood that some or all of the circuitry of FIG. 2 can, thus, be instantiated at the same or different times. Some or all of the circuitry can be instantiated, for example, in one or more threads executing concurrently on hardware and/or in series on hardware. Moreover, in some examples, one or more virtual machines and/or containers executing on the microprocessor can implement some or all of the circuitry of FIG. 2.

The example system 200 illustrated in FIG. 2 includes the example computing device 104 to standardize, clean, or otherwise edit, adjust, and/or alter the tuning data collected via ACR based on a set of editing rules. The computing device 104 of the example system 200 includes example communication interface circuitry 202, example media identification circuitry 204, example tuning event generation circuitry 205, example storage device(s) 210, example non-volatile memory 212, example tuning data editing rules 214, example volatile memory 216, example tuning data 218, example metadata 220, an example bus 222, example tuning data editing circuitry 224, example data preprocessing circuitry 226, example data processing circuitry 228, example view conflict resolution circuitry 230, example credit conflict resolution circuitry 232, example geographic location determination circuitry 234, and example media crediting circuitry 236. In the illustrated example of FIG. 2, the computing device 104 is in communication with an example database 206 that stores example media identifier(s) 208. The example computing device 104 can be an external server, supercomputing device, cloud data center, and/or back office computing facility to edit tuning data received from multiple presentation devices (e.g., presentation device 102) and/or households. In some examples, the computing device 104 sends the edited tuning data to another location and/or device (e.g., a central office, data server, database, etc.) for measuring, manipulating, crediting, and/or storing for gathering insights on audience viewing.

The example system 200 illustrated in FIG. 2 includes the communication interface circuitry 202 to establish a connection with and transmit information between the computing device 104 and the presentation device 102 of FIG. 1, the database 206, and/or other devices. In some examples, the system 200 includes a network (e.g., a wired or wireless network) with which the communication interface circuitry 202 can connect to transfer data to/from the computing device 104. The example communication interface circuitry 202 can be of a same or similar device and/or functionality as the communication interface circuitry 108 of FIG. 1.

As mentioned in reference to the example system of FIG. 1, the example presentation device 102 transmits the detected unique identifier of the media to the example computing device 104. The computing device 104 of the example system 200 illustrated in FIG. 2 includes the example media identification circuitry 204 to compare the unique identifier of the media against the media identifiers 208 stored in the example database 206. In some examples, the media identifiers 208 are generated by third parties (e.g., media distributors, media providers, etc.) using fingerprinting and/or watermarking algorithms. In some examples, the computing device 104 communicates the type(s) of media identifiers 208 stored in the database 206 to the identifier detection circuitry 126 such that the identifier detection circuitry 126 queries identifiers generated from a corresponding algorithm. When the example media identification circuitry 204 searches the database 206 and discovers an identifier that matches that of the media, then the media identification circuitry 204 retrieves the associated content metadata to be included with the tuning data. As discussed below, the tuning data editing circuitry 224 can rely on the amount, type, and/or quality of metadata of the tuning event to make decisions and determinations of the accompanying tuning data based on the example tuning data editing rules 214. The computing device 104 of the example system 200 includes the tuning event generation circuitry 205 to create a tuning event based on tuning data collected by the tuning data collection circuitry 128 and/or the media identification circuitry 204. For example, the tuning data collection circuitry 128 can identify when remote activities occur (e.g., a play action followed by a pause action) and/or application services, station codes, presentation devices, etc. associated with the remote activities. The example media identification circuitry 204 can also collect tuning data in the form of content metadata (e.g., media title, genre, network, etc.) to populate the tuning event. The example tuning event generation circuitry 205 can compile the tuning data associated with the remote activities and create a data set including the tuning data and the view start/end times of the tuning event.

The computing device 104 of the example system 200 includes the storage device(s) 210 to store the example tuning data editing rules 214, the example tuning data 218, and the example metadata 220 as illustrated in FIG. 2. The example storage device(s) 210 can include non-volatile memory 212 and/or volatile memory 216 similar to those explained above in reference to the storage device(s) 116 of FIG. 1. The example tuning data editing rules 214 can be machine-readable instructions that cause the tuning data editing circuitry 224 to edit the tuning data 218 based on the tuning data and/or metadata collected via ACR. In some examples, the tuning data editing rules 214 are stored in a different storage device (e.g., an external drive connected to the computing device 104) and/or are executed on a remote device (e.g., a cloud data center, a cloud base station, the presentation device 102, etc.). The example tuning data 218 can be raw tuning data to be edited or edited tuning data that has been processed according to the tuning data editing rules 214.

The example computing device 104 illustrated in FIG. 2 includes the tuning data editing circuitry 224 to standardize, clean, and/or otherwise edit tuning data collected via ACR. The example tuning data editing circuitry 224 can preprocess, filter, classify, organize, retain, and/or discard a portion of the tuning data of a tuning event. The computing device 104 of the example system 200 of FIG. 2 includes the bus 222 to communicatively couple processing circuitry (e.g., the tuning data editing circuitry 224 and/or the media identification circuitry 204), memory (e.g., the storage device(s) 210, the non-volatile memory 212, and/or the volatile memory 216), and input/output device(s) (e.g., the communication interface circuitry 202) of the computing device 104.

The tuning data editing circuitry 224 of FIG. 2 can be processor circuitry such as a central processing unit executing instructions. Additionally or alternatively, the tuning data editing circuitry 224 of FIG. 2 can be an ASIC or an FPGA structured to perform operations corresponding to the instructions. It should be understood that some or all of the tuning data editing circuitry 224 can, thus, be instantiated at the same or different times. Some or all of the tuning data editing circuitry 224 can be instantiated, for example, in one or more threads executing concurrently on hardware and/or in series on hardware. Moreover, in some examples, the tuning data editing circuitry 224 includes one or more virtual machines and/or containers executing on the microprocessor.

The example tuning data editing circuitry 224 illustrated in FIG. 2 can execute the tuning data editing rules 214 to standardize, clean, and/or edit the tuning data of the tuning event(s) obtained via ACR and sent to the computing device 104 from one or more devices (e.g., the presentation device 102). In some examples, the tuning data editing rules 214 are a series of determinations, decisions, processes, and/or procedures that are written, compiled, and/or executed in one or more sequences, orders, cycles, etc. The order in which the example tuning data editing rules 214 are written, compiled, and/or executed can be the same as the example order described herein. In some examples, the tuning data editing rules 214 are written, compiled, and/or executed in an order different than the example order and/or methodology described herein.

The example computing device 104 of the illustrated system 200 can apply the tuning data editing rules 214 at a given frequency (e.g., daily, hourly, half hourly, etc.) depending on the amount of tuning data 218 received, the number of devices (e.g., one or more presentation devices 102), and/or other factors included in the tuning data editing rules 214. In some examples, the tuning data editing rules 214 are modular such that the rules can be adjusted to apply to different media providers. In some examples, the tuning data editing rules 214 are applied to amend illogical, inconsistent, missing, and/or overlapping data such that the tuning data is correct and able to be credited (e.g., by the computing device 104, a back office computing facility, a data processing facility, a cloud computing center, etc.) and audience viewing insights are more accurately measured (e.g., compared to viewing measurements with tuning data not edited via the tuning data editing circuitry 224).

The computing device 104 of the example system 200 illustrated in FIG. 2 includes the data preprocessing circuitry 226 to perform preprocessing and initial cleaning of the tuning data (e.g., tuning data 218) and/or the metadata (e.g., metadata 220). In some examples, the data preprocessing circuitry 226 is instantiated by processor circuitry executing data preprocessing instructions and/or configured to perform operations such as those represented by the flowchart of FIG. 7. The example data preprocessing circuitry 226 obtains a credit time and a view time for the tuning event, given the data is available. In some examples, the credit time may return a null result, meaning that the example tuning data collection circuitry 128 was unable to collect the credit time via ACR (e.g., due to a portion of the ACR software 120 shutting off, the OTT application 118 not providing the credit time, etc.). In some examples, the media identification circuitry 204 obtains (or attempts to obtain) the credit time from a media provider, database (e.g., database 206), or other source after the media is identified. However, the credit time can be missing in cases when the media is streamed (as opposed to broadcasted), when the media does not air at a scheduled credit time, etc. In some examples, when the credit time is null for the example tuning event, then the data preprocessing circuitry 226 sets the credit start time and the credit end time equal to the view start time and the view end time, respectively. In some examples, when the credit time is not null for the example tuning event, and when the station code of the tuning event is the same as that of an immediately preceding tuning event, then the data preprocessing circuitry 226 merges the tuning event with the immediately preceding tuning event.

In some examples, the data preprocessing circuitry 226 standardizes the start and end times of the view and credit times of the tuning event. The example data preprocessing circuitry 226 can obtain instruction(s) from the tuning data editing rules 214 that indicate(s) the standard format to be used. For example, the data preprocessing circuitry 226 can standardize the times into timestamp formats the International Organization for Standardization (ISO) has created, such as timestamp formats included in the ISO 8601 international standard. In some examples, different types of presentation devices (e.g., presentation device 102) may apply timestamps to the tuning events in different formats. Standardizing the view and credit times allows the tuning data editing circuitry 224 to edit or resolve the tuning data from various presentation devices without mathematical errors occurring during an editing stage (e.g., when calculating play delay).

In some examples, the example data preprocessing circuitry 226 determines a play delay for the tuning event based on the standardized credit time and the standardized view time. In some examples, the play delay is calculated as the difference between the view start time and the credit start time. For example, the play delay of a tuning event with a view start time of 1:05 pm and a credit start time of 1:00 pm is 300 seconds (1:05 pm minus 1:00 pm). In some examples, the play delay is a negative value. For example, the play delay of a tuning event with a view start time of 12:55 pm and a credit start time of 1:00 pm is −300 seconds (12:55 pm minus 1:00 pm). Further details on negative play delays are described in greater detail below.

In some examples, the example data preprocessing circuitry 226 classifies the tuning event as live viewing or time-shifted viewing (TSV) based on the play delay and/or the availability (e.g., null/not null) of the credit time. In some examples, the data preprocessing circuitry 226 classifies the tuning event as live viewing or TSV to provide further insights on audience viewing behaviors, aid in crediting media to the tuning event, and prioritize tuning events that have view or credit conflicts as described below. The term "TSV" refers to a tuning event with a view start time after a credit start time and a play delay that exceeds a first threshold (e.g., a "near-live" threshold such as 30 seconds, 40 seconds, 60 seconds, etc.). In some examples, when the data preprocessing circuitry 226 determines that the credit time of the tuning event is null, then the data preprocessing circuitry 226 sets the credit time equal to the view time and classifies the tuning event as live viewing. In some examples, when the data preprocessing circuitry 226 determines that the credit time of the tuning event is a non-null value, then the play delay is calculated. In some such examples, when the calculated play delay is a positive value and satisfies the first threshold, then the data preprocessing circuitry 226 classifies the tuning event as live viewing. However, when the play delay is positive and does not satisfy the first threshold, then the example data preprocessing circuitry 226 classifies the tuning event as TSV.

The computing device 104 of the example system 200 of FIG. 2 includes the data processing circuitry 228 to make determinations/decisions regarding filtering, retaining, and/or editing portions of the tuning data of the tuning event collected via ACR. In some examples, the data processing circuitry 228 is instantiated by processor circuitry executing data processing instructions and/or configured to perform operations such as those represented by the flowchart of FIG. 7. In some examples, after the tuning data is preprocessed and the tuning event is classified as live viewing or TSV, the example data processing circuitry 228 filters the tuning event. In some examples, the data processing circuitry 228 filters the tuning event prior to the preprocessing of the tuning data. The filtration of the tuning event is the process of discarding or retaining the tuning event and/or portions of the tuning data associated therewith when the data processing circuitry 228 determines that the tuning event is illogical. For example, when the view start timestamp is the same as the view end timestamp, when the view start timestamp follows the view end timestamp, when the credit start timestamp is the same as the credit end timestamp, or when the credit start timestamp follows the credit end timestamp, then the data processing circuitry 228 discards and/or deletes the tuning event. The data processing circuitry 228 discards illogical tuning events so the media crediting circuitry 236 does not spend processing time and/or processing power parsing through tuning events and crediting media to the tuning events that did not actually occur.

In some examples, the data preprocessing circuitry 226 calculates a negative value for the play delay, as described previously. A negative play delay can occur due to error(s) in the ACR of the presentation device 102, error(s) in the standardization of the data preprocessing circuitry 226, error(s) in the credit time(s) that a network provides, etc. In some examples, when the negative play delay satisfies a second threshold (e.g., an "illogical" threshold, such as −300 seconds, −250 seconds, −120 seconds, etc.), then the example data preprocessing circuitry 226 classifies the tuning event as live tuning and sets the credit start time equal to the view start time. In some such examples, when the play delay does not satisfy the second threshold (e.g., when the play delay is seven minutes (−420 seconds) and the second threshold is five minutes (−300 seconds)), then the data processing circuitry 228 discards the tuning data of the tuning event.

View or credit conflicts between tuning events on the same device inhibits the media crediting circuitry 236 from accurately crediting the tuning events with media such as film, TV series, online videos, etc. For example, when the media crediting circuitry 236 receives unedited tuning data that includes a view conflict between first and second tuning events, the media crediting circuitry 236 can credit the first tuning event to the overlapping time period even though the second tuning event was actually viewed during that time. Additionally, when a conflict exists in unedited tuning data, the media crediting circuitry 236 can return an error message to be resolved by an operator of the computing device 104. This can result in longer processing times and inefficient media crediting operations.

The example system 200 illustrated in FIG. 2 includes the view conflict resolution circuitry 230 to determine, identify, detect, discern, and/or recognize whether a view conflict exists between a given tuning event and one or more other tuning events. In some examples, the example view conflict resolution circuitry 230 is also able to resolve the view conflicts when determined to exist. In some examples, the view conflict resolution circuitry 230 is instantiated by processor circuitry executing view conflict resolution instructions and/or configured to perform operations such as those represented by the flowchart of FIGS. 7-11. As used herein, the term view conflict refers to an occurrence where two or more tuning events share the same portion(s) of viewing period(s), wherein the tuning data of the two or more tuning events are collected via ACR on the same presentation device (e.g., presentation device 102). For example, the presentation device 102 detects a first tuning event with a view start time of 1:00 pm and a view end time of 2:00 pm, and a second tuning event with a view start time of 1:30 pm and a view end time of 2:30 pm. The first tuning event and the second tuning event are said to have a view conflict since the time between 1:30 pm and 2:00 pm is credited to both tuning events viewed on the same device. For simplicity, detailed descriptions regarding view conflict resolution and credit conflict resolution (described in greater detail below) are made with reference to a first tuning event and a second tuning event with potentially conflicting view times and/or credit times. However, the examples disclosed herein may be used to resolve view conflicts and/or credit conflicts between more than two tuning events (e.g., three, four, five tuning events, etc.) credited to the same device.

In some examples, the view conflict resolution circuitry 230 determines whether a view conflict exists between the first and second tuning events and, in response to determining that the view conflict exists, applies the tuning data editing rules 214 to resolve the view conflict. To resolve the view conflict, the example view conflict resolution circuitry 230 identifies the overlapped view times between two or more tuning events from the same device, decides a "winner" event based on the tuning data editing rules 214, adjusts the start and/or end times of the conflicting tuning event(s), and generates, produces, and/or creates a new (e.g., a third) tuning event for the overlap period. The new tuning event is populated with tuning data and/or content metadata corresponding to the winner event. In some examples, the view conflict resolution 230 does not create the new tuning event.

Rather, in those examples, the view conflict resolution circuitry 230 adjusts the view start/end time(s) of the tuning events to remove the conflict. For example, when the first tuning event of the above example is the "winner" event, the view conflict resolution circuitry 230 can adjust the view start time of the second tuning event to correspond with the view end time of the first tuning event. In other words, the view conflict resolution circuitry 230 can change the view start time of the second tuning event from 1:30 pm to 2:00 pm.

For the above example (the view time of the first tuning event from 1:00 pm to 2:00 pm, and the view time of the second tuning event from 1:30 pm to 2:30 pm), when the view conflict resolution circuitry 230 determines that the first tuning event is the winner event, then the view conflict resolution circuitry 230 adjusts the view end time of the first tuning event to 1:30 pm, adjusts the view start time of the second tuning event to 2:00 pm, and creates a third tuning event from 1:30 pm to 2 pm that includes the tuning data and content metadata of the first tuning event. In some examples, the view conflict is caused by a remote activity (e.g., play, pause, seek, etc.) and/or a trick mode. Thus, the new tuning event is created to have a consistent timeline of tuning events that accurately represents audience activity during the view period and allows for more accurate media crediting of the new tuning event.

FIG. 3 is an illustration of an example view conflict 300 during a view time 302 between a first tuning event 304 and a second tuning event 306. An overlap period 308 is shown to represent portions of view times of the first and second tuning events 304, 306 that conflict with one another. In other words, the overlap period 308 is the portion of the view time 302 that is included in the tuning data of both the first and second tuning events 304, 306.

FIG. 4 is an illustration of an example view conflict resolution 400 based on edits performed on the view conflict resolution 300 of FIG. 3. In the illustrated example, the view conflict resolution circuitry 230 determines that the first tuning event 304 is the winner event based on the tuning data available for the first and second tuning events 304, 306 and the example tuning data editing rules 214. Following the determination, the example view conflict resolution circuitry 230 adjusts the view end time of the first tuning event 304, adjusts the view start time of the second tuning event 306, and creates a third tuning event 402 with a view time corresponding to the overlap period 308. The example view conflict resolution circuitry 230 also populates the third tuning event 402 with the tuning data and metadata associated with the winner event (e.g., the first tuning event 304).

In general, to determine the "winner" tuning event, the tuning data editing rules 214 prioritize tuning event(s) with live viewing, shorter play delay, more complete content metadata, assigned station codes (e.g., as opposed to an AOT station code), and/or proprietary application service IDs. In some examples, the station codes identified for tuning events viewed on streaming application services are of the same type (e.g., "station 5005/Internet") despite the ownership or proprietary nature of the application service.

In some examples, the station code, application service ID, and play delay are the primary factors that the view conflict resolution circuitry 230 uses to identify the winner event of a view conflict. However, when these factors are equivalent between the conflicting tuning events, the view conflict resolution circuitry 230 can use other factors (e.g., view start/end times, content metadata, network information, information of surrounding tuning events, etc.) to determine the winner event. To determine whether a view conflict exists, the view conflict resolution circuitry 230 can examine pairs of tuning events from the same data date. For example, the view conflict resolution circuitry 230 determines that a view conflict exists between a first tuning event and a second tuning event and that a view conflict also exists between the first tuning event and a third tuning event. Portions of the view times of the first, second, and third tuning events may all be shared, in which case the example view conflict resolution circuitry 230 resolves the view conflict between the first and second tuning events, determines a winner event, and then resolves the view conflict between the winner event and the third event.

In some examples, the view conflict resolution circuitry 230 makes a series of decisions to determine whether a view conflict exists between a first tuning event and a second tuning event. For example, when a device ID of the first tuning event matches the device ID of the second tuning event, the view start time of the first tuning event is before the view end time of the second tuning event, the view end time of the first tuning event is after the view start time of the second tuning event, and an event ID of the first tuning event does not match the event ID of the second tuning event, then the view conflict resolution circuitry 230 determines that the view conflict exists between the first and second tuning events. In some such examples, when one of the above four mentioned criteria are not satisfied, then the view conflict resolution circuitry 230 determines that the view conflict does not exist between the first and second tuning events.

The tuning data editing rules 214 include instructions that cause the view conflict resolution circuitry 230 to determine a winner event based on the type of application service associated with the tuning event(s). For example, the view conflict resolution circuitry 230 determines whether the example first and/or second tuning events were viewed on the presentation device 102 using a proprietary application service. Proprietary application services directly measure tuning events via ACR, and tuning events associated with non-proprietary application services are measured using other ACR software (e.g., ACR software 120). Thus, conflicting tuning events viewed on proprietary application services are prioritized when applicable.

For example, the view conflict resolution circuitry 230 discovers that the application service ID of the first tuning event is that of a provider-owned and/or network-owned application service and that the tuning event is associated with media content that the same provider or network also owns (e.g., if the media is a CNN® program viewed on a CNN® application service). When, for example, the application service ID of the first tuning event is a proprietary application service, and the application service ID of the second tuning event is not a proprietary application service, then the view conflict resolution circuitry 230 determines that the first tuning event is the winner event. When the first and the second tuning events both have proprietary application service IDs or when neither have proprietary application service IDs, then the view conflict resolution circuitry 230 determines the winner event based on other criteria (e.g., station code, play delay, content metadata, etc.).

In some examples, the view conflict resolution circuitry 230 is unable to resolve the view conflict based on the application service IDs alone (e.g., both conflicting tuning events have proprietary application service IDs). In some such examples, the view conflict resolution circuitry 230 determines whether the first and second tuning events have the same station code. For example, the view conflict resolution circuitry 230 identifies the station codes of the first and second tuning events to be "5005/Internet." In some examples, the view conflict resolution circuitry 230 determines that both the first and second tuning events have station codes categorized as AOT. When the station codes of the first and the second tuning events are the same or are both AOT, then the view conflict resolution circuitry 230 determines whether the first and/or second tuning events have null application service IDs. When one of the two example tuning events has a non-null application service ID, then the view conflict resolution circuitry 230 determines the winner event to be the tuning event with a non-null application service ID. This is because it is more likely that the tuning event actually viewed during the overlap period 308 (e.g., the winner event) would include an application service ID in the tuning data. Further, when one of the conflicting tuning events has a null application service ID, then that tuning event is more likely to have less reliable information, such that content detection and metadata filing can be incomplete.

In some examples, the station codes are the same, and the first and second tuning events have null or non-null application service IDs. In some such examples, the view conflict resolution circuitry 230 determines whether the tuning events have the same play delay. When the tuning events have unequal play delays, then the view conflict resolution circuitry 230 determines the winner event based on which tuning event has the smaller of the two play delays. The smaller play delay is prioritized because the associated tuning event is more likely to be live viewing, which are more common and are more likely to be accurately identified using ACR. Thus, retaining the live viewing tuning event is more logical than retaining the TSV tuning event.

However, when conflicting tuning events have the same station code, null application service IDs, and the same play delay, then in some examples the view conflict resolution circuitry 230 determines the winner event based on which tuning event has more content metadata. Since station codes, application service IDs, and play delays are the same, the content metadata such as content title, content TMS ID and network name are checked to resolve the view conflict. Having more metadata to describe the tuning event indicates a more complete and more reliable tuning event. More metadata also provides more context for the tuning data of the tuning event and can allow for more representative audience measurement and/or more accurate media crediting. In some examples, when the content metadata is the same between the two conflicting tuning events, then the tuning events apply to a same content, and to retain one tuning event over another is neither more nor less accurate.

In some examples, the view conflict resolution circuitry 230 determines that the first and second tuning events have the same station code, same play delay, the same amount of content metadata, and non-null application service IDs. In some such examples, the winner event is determined based on the view time(s) of the first and/or second tuning events, the application service IDs of the first and second tuning events, and/or the application service ID(s) of other adjacent tuning event(s). For example, the view conflict resolution circuitry 230 determines whether the first and second tuning events have the same view start times and/or the same view end times. When the view start time of the first or the second tuning events are unequal, the view conflict resolution circuitry 230 determines the winner event to be the tuning event with the earlier view start time because that event is more likely to be a live viewing event, which is more common and is more likely to be accurately identified using ACR. When the view start times of the first and second tuning events are the same, and when the view end times of the first and second tuning events are unequal, then the view conflict resolution circuitry 230 determines the winner event to be the tuning event with the later view start time because the event with the longer view time is more likely to be reliable and accurate.

In some examples, the view conflict resolution circuitry 230 determines that the first and second tuning events have the same station code, same play delay, same view start time, same view end time, as well as unequal and non-null application service IDs. In some such examples, the view conflict resolution circuitry 230 determines whether adjacent tuning event(s) have the same application service ID(s) as the first or second tuning event(s). As used herein, an adjacent tuning event is one with a view time that is preceding to or subsequent to the first and/or second tuning events without overlapping with the view times of the first or second tuning events (e.g., not conflicting with the first or second tuning events). For example, the first tuning event has a view time of 1:00 pm to 1:30 pm, the second tuning event has a view time of 1:15 pm to 1:45 pm, and a third tuning event has a view time of 12:15 pm to 12:45 pm. The example third tuning event is said to be a preceding tuning event as long as there is no fourth tuning event between 12:45 pm and 1:00 pm.

In some examples, the view conflict resolution circuitry 230 determines whether a preceding tuning event or a subsequent tuning event has the same application service ID as one of the first tuning event or the second tuning event (e.g., when the first and second tuning events do not have the same application service ID). In some examples, when the preceding tuning event has the same application service ID as either the first tuning event or the second tuning event, the view conflict resolution circuitry 230 determines the winner event to be the tuning event with the matching application service ID. Since the example preceding tuning event has the same application service ID as the winner event, it is more likely that the tuning event with the same application service ID is the more reliable of the two conflicting events. In some examples, the preceding event does not have the same application service ID as the first or second tuning events In some examples, when the subsequent tuning event has the same application service ID as the first or the second tuning event, the view conflict resolution circuitry 230 determines the winner event to be the tuning event with the matching application service ID. Since the example subsequent tuning event has the same application service ID as the winner event, it is more likely that the tuning event with the same application service ID is the more reliable of the two conflicting events. In some examples. When neither the preceding nor the subsequent tuning events have the same application service IDs as the first or second tuning events, then the view conflict resolution circuitry 230 determines the winner event to be the tuning event with the application service ID that is earliest in alphabetical order. For example, when neither the preceding nor the subsequent tuning events have the same application service IDs, when the first tuning event has an application service ID beginning with the letter "J", and when the second tuning event has an application service ID beginning with the letter "K", then the view conflict resolution circuitry 230 determines the first tuning event to be the winner event. Since key information (e.g., station code, application service ID, etc.) is not adequate to resolve the view conflict, a deterministic approach (e.g., alphabetical order) is used to resolve the conflict such that consistent determinations are applied across other applicable view conflicts.

In some examples, the view conflict resolution circuitry 230 determines that the first and second tuning events do not have the same station codes and have null application service IDs. In some such examples, the view conflict resolution circuitry 230 determines the winner event based on the view time(s) of the first and/or second tuning events, the station code(s) of other adjacent tuning event(s), and/or the station codes of the first and second tuning events. For example, the view conflict resolution circuitry 230 determines whether one of the first or the second tuning event has an unknown station code. In some examples, when the station code of one of the tuning events (e.g., the first or the second tuning events) is known and the other station code is null (e.g., station code of AOT), the view conflict resolution circuitry 230 determines the winner event to be the tuning event with the known station code. The conflicting tuning event corresponding to the known station code is retained because it is more likely that the tuning event with the known station code includes more reliable tuning data and more complete and accurate metadata.

In some examples, the view conflict resolution circuitry 230 detects that the station codes of the conflicting events are known (e.g., not AOT) and are different. In some examples, when the first and second tuning events have known and different station codes, the view conflict resolution circuitry 230 determines whether the first and second tuning events have the same view start times and/or the same view end times. In some examples, when the view start time of the first or the second tuning events are unequal, the view conflict resolution circuitry 230 determines the winner event to be the tuning event with the earlier view start time since that is the event that is more likely to be live viewing. Live viewing events are prioritized because live viewing occurs more frequently and is generally identified more accurately using ACR than TSV. Thus, retaining the live viewing tuning event is more logical than retaining the TSV tuning event. In some examples, when the view start times of the first and second tuning events are the same, and when the view end times of the first and second tuning events are unequal, the view conflict resolution circuitry 230 determines the winner event to be the tuning event with the later view end time because the tuning event with the longer view time is likely to be more reliable than the tuning event with the shorter view time.

In some examples, the view conflict resolution circuitry 230 determines that the first and second tuning events have the same view start time, same view end time, null application service IDs, as well as known and different station codes. In some such examples, the view conflict resolution circuitry 230 determines whether adjacent tuning event(s) have the same station code(s) as the first or second tuning event(s). In some examples, the view conflict resolution circuitry 230 determines whether a preceding tuning event or a subsequent tuning event have the same station code as one of the first tuning event or the second tuning event. In some such examples, when the preceding tuning event has the same station code as either the first tuning event or the second tuning event, the view conflict resolution circuitry 230 determines the winner event to be the tuning event with the matching station code because it is more likely that the tuning event with the same station code as the example preceding tuning event is the more reliable of the two conflicting events. In some such examples, when the preceding event does not have the same station code as the first or second tuning events, and when the subsequent tuning event has the same station code as the first or second tuning event, the view conflict resolution circuitry 230 determines the winner event to be the tuning event with the matching station code because it is more likely that the tuning event with the same station code as the example subsequent tuning event is the more reliable of the two conflicting events.

In some examples, when the first and second tuning events have different station codes and null application service IDs, the view conflict resolution circuitry 230 cannot determine the winner event based on the station code(s), view start times, view end times, or adjacent tuning events alone. In some such examples, the view conflict resolution circuitry 230 can determine the winner event based on the viewing classification of one of the first or second tuning events. For example, when the first tuning event is classified as live viewing, and the second tuning event is classified as TSV, then the view conflict resolution circuitry 230 determines the winner event to be the first tuning event because live viewing events occur more frequently and are more likely to be accurately identified using ACR than TSV events. However, in some examples, when the first and second tuning events are both live view or TSV, neither the preceding nor the subsequent tuning events have the same station codes as the first or second tuning events, or the first and second tuning events have the same view start time and view end time, the view conflict resolution circuitry 230 uses a deterministic approach to resolve the view conflict. For example, the view conflict resolution circuitry 230 determines the winner based on the station code that is earliest in numerical order. For example, when the first tuning event has a station code of "1234", and when the second tuning event has a station code of "1245", then the view conflict resolution circuitry 230 determines the first tuning event to be the winner event. Since no key information (e.g., station code, application service ID, play delay, view time, etc.) in the conflicting events or the surrounding events provide enough evidence to resolve the view conflict, then the deterministic approach is used to consistently resolve similar conflicts across a variety of tuning events.

The computing device 104 of the example system 200 illustrated in FIG. 2 includes the example credit conflict resolution circuitry 232 to determine whether a credit conflict exists between two tuning events and to determine a view time gap between the two tuning events. In some examples, in response to determining that the credit conflict exists and that the view time gap satisfies a third threshold (e.g., a "consecutive event" threshold such as one second, two seconds, etc.), the credit conflict resolution circuitry 232 removes a portion of the credit conflict from the tuning data corresponding to the tuning events. In some examples, the credit conflict resolution circuitry 232 is instantiated by processor circuitry executing credit conflict resolution instructions and/or configured to perform operations such as those represented by the flowchart of FIG. 7. As used herein, the term "credit conflict" refers to an occurrence where two or more tuning events share the same portion(s) of credit time, wherein the two or more tuning events are collected via ACR on the same presentation device (e.g., presentation device 102), have the same station code, and have consecutive view times. In some examples, if the conflicting tuning events are credited to the same device, have the same station code, and are viewed consecutively, then the credit conflict is resolved when the gap between the view times of the conflicting tuning events satisfies the third threshold. The third threshold corresponds to the view time gap between consecutive tuning events.

In some examples, credit conflicts occur because a user of a presentation device (e.g., presentation device 102) rewinds or pauses the content during the viewing. While the example pause or rewind occurs, a trick mode may also be displayed on the screen of the presentation device 102. However, ACR may be unable to detect trick modes when they occur. A "trick mode" refers to a feature of digital media content that simulates the visual feedback during fast-forward and rewind operations that were provided by analogue media playback systems (e.g., video cassette recorders (VCRs)). During the trick mode, the example presentation device 102 only displays a subset of frames included in the portion of media being paused, fast-forwarded, or rewound. In some examples, the trick mode displays the current frame, different frame thumbnails, and/or a progress bar indicating the timestamp of the content.

Figure 5:
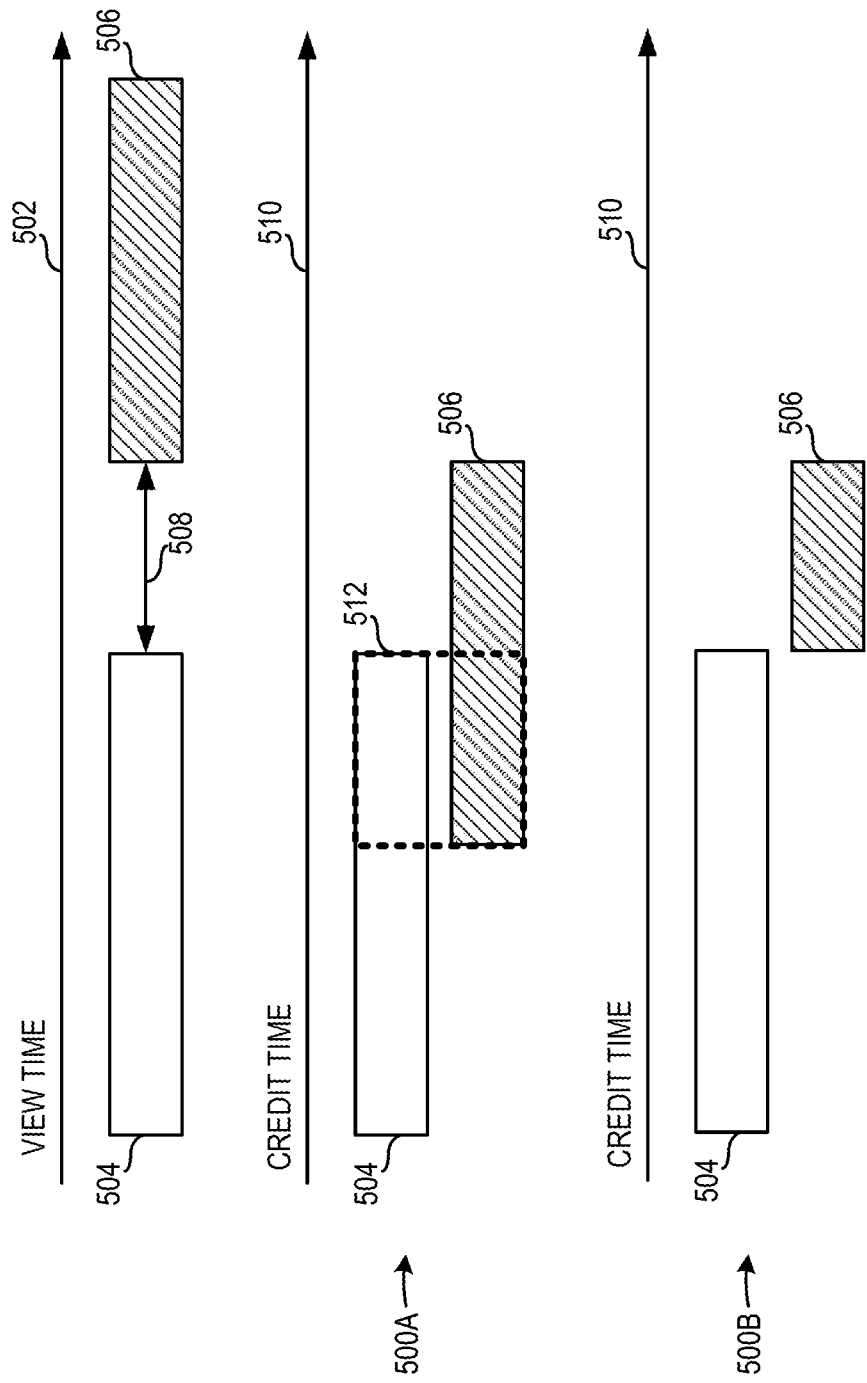
FIG. 5 is an illustration of an example credit conflict between two example tuning events.

FIG. 5 is an illustration of an example credit conflict 500A and an example credit conflict resolution 500B between two consecutive tuning events. The credit conflict 500A occurs over the course of a view time period 502 between an example first tuning event 504 and an example second tuning event 506. The first and second tuning events 504, 506 are presented on a same presentation device (e.g., presentation device 102), have the same station code (e.g., station code 1234), and are presented consecutively without an intermediate tuning event. The credit conflict 500A and credit conflict resolution 500B include an example view time gap 508 between the view end time of the first tuning event 504 and the view start time of the second tuning event 506.

The example credit conflict 500A and credit conflict resolution 500B illustrated in FIG. 5 also show an example credit time period 510 during which the first and second tuning events 504, 506 have been credited. In some examples, the credit time period 510 occurs over the same timeframe as the view time period 502, such as when the first and second tuning events 504, 506 are live viewing. The example credit conflict 500A includes an example credit overlap 512 to show a portion of the credit time period 510 when the credit time of the first tuning event 504 conflicts with the credit time of the second tuning event 506. In some examples, the view time gap 508 satisfies the third threshold such that the credit conflict resolution circuitry 232 removes the credit overlap 512, as shown with the credit conflict resolution 500B. Thus, the credit conflict resolution circuitry 232 essentially identify that a trick mode has occurred even though there is no indicators of the trick mode in ACR data of the first and second tuning events 504, 506. The credit conflict resolution circuitry 232 can then remove the credit overlap 512 that occurred due to the trick mode. In some examples, the view time gap 508 does not satisfy the third threshold, and the credit conflict resolution circuitry 232 leaves the credit conflict in the tuning data of the first and second tuning events 504, 506. Thus, user behavior (e.g., rewatching) can be accounted for during data analysis and/or audience measurement stages.

In an example use case, the first tuning event 504 has a view time from 01:30:00 pm to 01:35:00 pm, the user of the presentation device 102 rewinds the content at 01:35:00 pm for one second, and the user continues to view the content at 01:35:01 pm, thus triggering the second tuning event 506. The example second tuning event 506 then has a view time from 01:35:01 pm to 01:38:00 pm. If, for example, first and second tuning events 504, 506 are live viewing, and the one-second-long rewind causes the presentation device 102 to rewind the content by two minutes, then the credit time of the first tuning event 504 is from 01:30:00 pm to 01:35:00 pm, and the credit time of the second tuning event 506 is from 01:33:00 pm to 01:35:59 pm. Since the view time gap 508 satisfies the example third threshold (e.g., one second), there is an implication that the credit conflict occurred due to a trick mode, and the credit conflict resolution circuitry 232 can resolve the credit conflict 500A. The credit conflict resolution 500B illustrates that the credit conflict resolution circuitry 232 adjusts the credit start time of the second tuning event 506 from 01:33:00 pm to 01:35:00 pm to account for the one-second-long trick mode. Alternatively, in some examples, the credit conflict resolution circuitry 232 adjusts the credit end time of the first tuning event 504 from 01:35:00 pm to 01:33:00 pm to account for the one-second-long trick mode. In general, the credit conflict resolution circuitry 232 can identify trick modes associated with certain audience behaviors (e.g., rewind, fast forward, pause, etc.) when a credit conflict is present and includes a view time gap 508 that satisfies the third threshold. Thus, resolving credit conflicts can allow the computing device 104 and/or the media crediting circuitry 236 to credit media to tuning events more efficiently, spend less memory storing unnecessary credit time tuning data, and identify trick modes that can be used in behavioral analyses of audience viewing.

The computing device 104 of the example system 200 illustrated in FIG. 2 includes the example geographic location determination circuitry 234 to assign, allocate, and/or attribute a geographic location to the presentation device 102 based on the tuning data collected via ACR. In some examples, the geographic location determination circuitry 234 is instantiated by processor circuitry executing geographic location determination instructions and/or configured to perform operations such as those represented by the flowchart of FIG. 12. In some examples, a provider and/or the tuning data collection circuitry 128 of FIG. 1 can derive a designated market area (DMA) of the example presentation device 102 based on Wi-Fi positioning data and/or IP addresses reported to the computing device 104. However, the DMA can return as null, or multiple DMAs can be detected for the same presentation device 102. The example geographic location determination circuitry 234 can execute the tuning data editing rules 214 to determine the DMA of the presentation device 102 when the DMA returns null or when multiple DMAs are detected, discerned, recognized, etc.

In some examples, the geographic location determination circuitry 234 detects multiple DMAs for the presentation device 102 over a contiguous tuning data collection period (e.g., 28, 30, 35 day time frame, etc.). In some examples, when multiple non-null DMAs are assigned to the presentation device 102, then the geographic location determination circuitry 234 assigns the non-null DMA that appears earliest in the contiguous time frame. In some examples, when a single or multiple null DMA(s) are detected for the presentation device 102 over the time period, then the geographic location determination circuitry 234 determines whether the presentation device 102 collected tuning data corresponding to local affiliate stations. For example, when local affiliate tuning data has been collected via ACR, then the geographic location determination circuitry 234 identifies the different market areas associated with the local affiliate tuning data and sums the tuning minutes for the different market areas. When one market area has the highest sum of tuning minutes, then the geographic location determination circuitry 234 assigns that DMA to the presentation device 102. In some examples, when more than one market area has the same sum of tuning minutes as the highest sum calculated, then the geographic location determination circuitry 234 assigns presentation device 102 with the DMA that has the highest sum and that appears first in the contiguous time frame.

In some examples, no local affiliate tuning data is collected when a single or multiple null DMA(s) are detected for the presentation device 102 over a data collection time frame. In some examples, when no local affiliate data is collected, the geographic location determination circuitry 234 calculates a distribution that matches the distribution of DMAs across monitored households. The distribution is calculated as the total sum of weights over the data collection time period. The example geographic location determination circuitry 234 then samples from the calculated distribution to randomly assign a DMA to the presentation device 102. The random DMA is intended to be assigned to the presentation device 102 based on the highest probability that the presentation device 102 is located in the DMA.

In some examples, the computing device 104 includes means for preprocessing tuning data that the presentation device 102 collects via ACR. For example, the means for preprocessing may be implemented by data preprocessing circuitry 226. In some examples, the data preprocessing circuitry 226 may be instantiated by processor circuitry such as the example processor circuitry 1312 of FIG. 13. For instance, the data preprocessing circuitry 226 may be instantiated by the example microprocessor 1400 of FIG. 14 executing machine executable instructions such as that implemented by at least blocks 702-714, 728 of FIG. 7 and 912 of FIG. 9. In some examples, the data preprocessing circuitry 226 may be instantiated by hardware logic circuitry, which may be implemented by an ASIC, XPU, or the FPGA circuitry 1500 of FIG. 15 structured to perform operations corresponding to the machine readable instructions. Additionally or alternatively, the data preprocessing circuitry 226 may be instantiated by any other combination of hardware, software, and/or firmware. For example, the data preprocessing circuitry 226 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 104 includes means for processing tuning data that the presentation device 102 collects via ACR. For example, the means for processing may be implemented by data processing circuitry 228. In some examples, the data processing circuitry 228 may be instantiated by processor circuitry such as the example processor circuitry 1312 of FIG. 13. For instance, the data processing circuitry 228 may be instantiated by the example microprocessor 1400 of FIG. 14 executing machine executable instructions such as that implemented by at least block 716 of FIG. 7. In some examples, the data processing circuitry 228 may be instantiated by hardware logic circuitry, which may be implemented by an ASIC. XPU, or the FPGA circuitry 1500 of FIG. 15 structured to perform operations corresponding to the machine readable instructions. Additionally or alternatively, the data processing circuitry 228 may be instantiated by any other combination of hardware, software, and/or firmware. For example, the data processing circuitry 228 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 104 includes means for resolving view conflicts between two or more tuning events that include tuning data collected via ACR. For example, the means for resolving the view conflict may be implemented by view conflict resolution circuitry 230. In some examples, the view conflict resolution circuitry 230 may be instantiated by processor circuitry such as the example processor circuitry 1312 of FIG. 13. For instance, the view conflict resolution circuitry 230 may be instantiated by the example microprocessor 1400 of FIG. 14 executing machine executable instructions such as that implemented by at least blocks 718, 720 of FIG. 7, 802-818 of FIG. 8, 902-918 of FIG. 9, 1002-1020 of FIG. 10, and 1102-1126 of FIG. 11. In some examples, the view conflict resolution circuitry 230 may be instantiated by hardware logic circuitry, which may be implemented by an ASIC. XPU, or the FPGA circuitry 1500 of FIG. 15 structured to perform operations corresponding to the machine readable instructions. Additionally or alternatively, the view conflict resolution circuitry 230 may be instantiated by any other combination of hardware, software, and/or firmware. For example, the view conflict resolution circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 104 includes means for resolving a credit conflict between two or more tuning events that include tuning data collected via ACR. For example, the means for resolving the credit conflict may be implemented by credit conflict resolution circuitry 232. In some examples, the credit conflict resolution circuitry 232 may be instantiated by processor circuitry such as the example processor circuitry 1312 of FIG. 13. For instance, the credit conflict resolution circuitry 232 may be instantiated by the example microprocessor 1400 of FIG. 14 executing machine executable instructions such as that implemented by at least blocks 722 and 724 of FIG. 7. In some examples, the credit conflict resolution circuitry 232 may be instantiated by hardware logic circuitry, which may be implemented by an ASIC, XPU, or the FPGA circuitry 1500 of FIG. 15 structured to perform operations corresponding to the machine readable instructions. Additionally or alternatively, the credit conflict resolution circuitry 232 may be instantiated by any other combination of hardware, software, and/or firmware. For example, the credit conflict resolution circuitry 232 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the computing device 104 includes means for assigning a geographic location to the presentation device 102. For example, the means for assigning may be implemented by geographic location determination circuitry 234. In some examples, the geographic location determination circuitry 234 may be instantiated by processor circuitry such as the example processor circuitry 1312 of FIG. 13. For instance, the geographic location determination circuitry 234 may be instantiated by the example microprocessor 1400 of FIG. 14 executing machine executable instructions such as that implemented by at least blocks 726 of FIG. 7 and 1202-1222 of FIG. 12. In some examples, the geographic location determination circuitry 234 may be instantiated by hardware logic circuitry, which may be implemented by an ASIC, XPU, or the FPGA circuitry 1500 of FIG. 15 structured to perform operations corresponding to the machine readable instructions. Additionally or alternatively, the geographic location determination circuitry 234 may be instantiated by any other combination of hardware, software, and/or firmware. For example, the geographic location determination circuitry 234 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the computing device 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example data preprocessing circuitry 226, the example data processing circuitry 238, the example view conflict resolution circuitry 230, the example credit conflict resolution circuitry 232, the example geographic location determination circuitry 234, and/or, more generally, the example computing device 104 of FIG. 1, may be implemented by hardware alone or by hardware in combination with software and/or firmware. Thus, for example, any of the example data preprocessing circuitry 226, the example data processing circuitry 238, the example view conflict resolution circuitry 230, the example credit conflict resolution circuitry 232, the example geographic location determination circuitry 234, and/or, more generally, the example computing device 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example computing device 104 of FIG. 1 may include one or more elements, processes, and/or devices in addition to, or instead of, those illustrated in FIG. 2, and/or may include more than one of any or all of the illustrated elements, processes and devices.

A flowchart representative of example hardware logic circuitry, machine readable instructions, hardware implemented state machines, and/or any combination thereof for implementing the computing device 104 of FIG. 2 is shown in FIGS. 6-12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6-12, many other methods of implementing the example computing device 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 6:
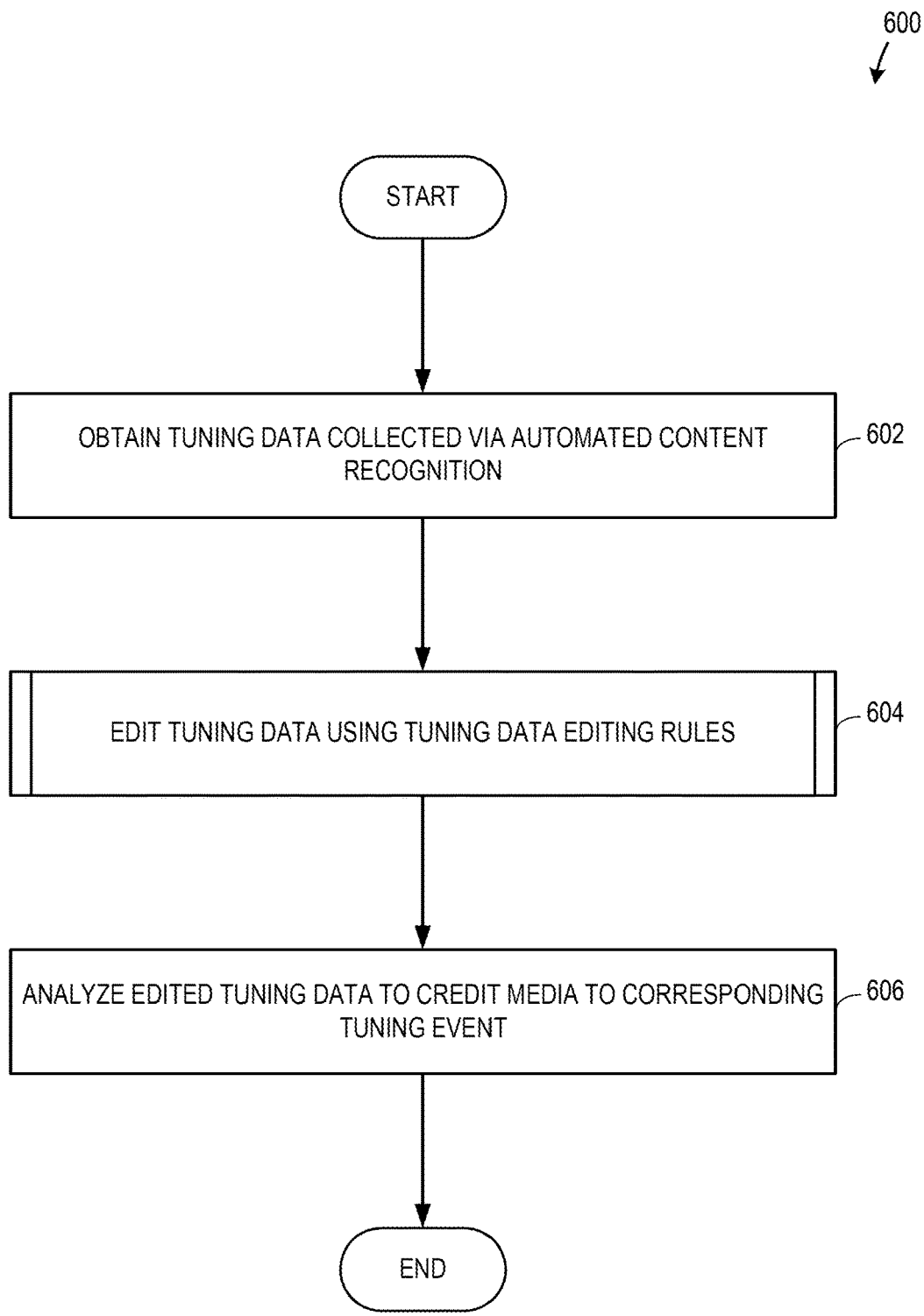
FIGS. 6-12 are a flowcharts representative of example machine readable instructions and/or example operations that may be executed by example processor circuitry to implement the computing device of FIG. 2.

FIG. 6 is a flowchart representative of example machine readable instructions and/or example operations 600 that may be executed and/or instantiated by processor circuitry to implement functionality in the computing device 104 that performs media crediting by cleaning, refining, or otherwise editing tuning data to be analyzed for media crediting purposes. The machine readable instructions and/or the operations 600 of FIG. 6 begin at block 602, at which the computing device 104 obtains tuning data collected via ACR by the presentation device 102. For example, the communication interface circuitry 202 obtains tuning data to be edited from the presentation device 102 and sends the tuning data to the tuning event generation circuitry 205. The generated tuning event(s) are then transmitted to the tuning data editing circuitry 224 to be cleaned, refined, or otherwise edited.

At block 604, the computing device 104 edits the tuning data using the tuning data editing rules 214. For example the tuning data editing circuitry 224 executes the tuning data editing rules 214 to preprocess, filter, and resolve view/credit conflicts of the tuning data and to assign a geographic location to the presentation device 102. The details of block 604 are described below in reference to FIG. 7.

At block 606, the computing device 104 analyzes the edited tuning data to credit media corresponding to the tuning event. For example, the media crediting circuitry 236 can parse through tuning data (e.g., view times, credit times, metadata, etc.) of the tuning events to determine what media was presented during the tuning event. Since the tuning event is edited, the media crediting circuitry 236 does not spend processing time and/or power parsing through unclean, unrefined, or otherwise unedited tuning data to credit media to the corresponding tuning event. Further, the media crediting circuitry 236 can determine more accurate media credits since the tuning data does not include illogical, conflicting, or missing data.

Figure 7:
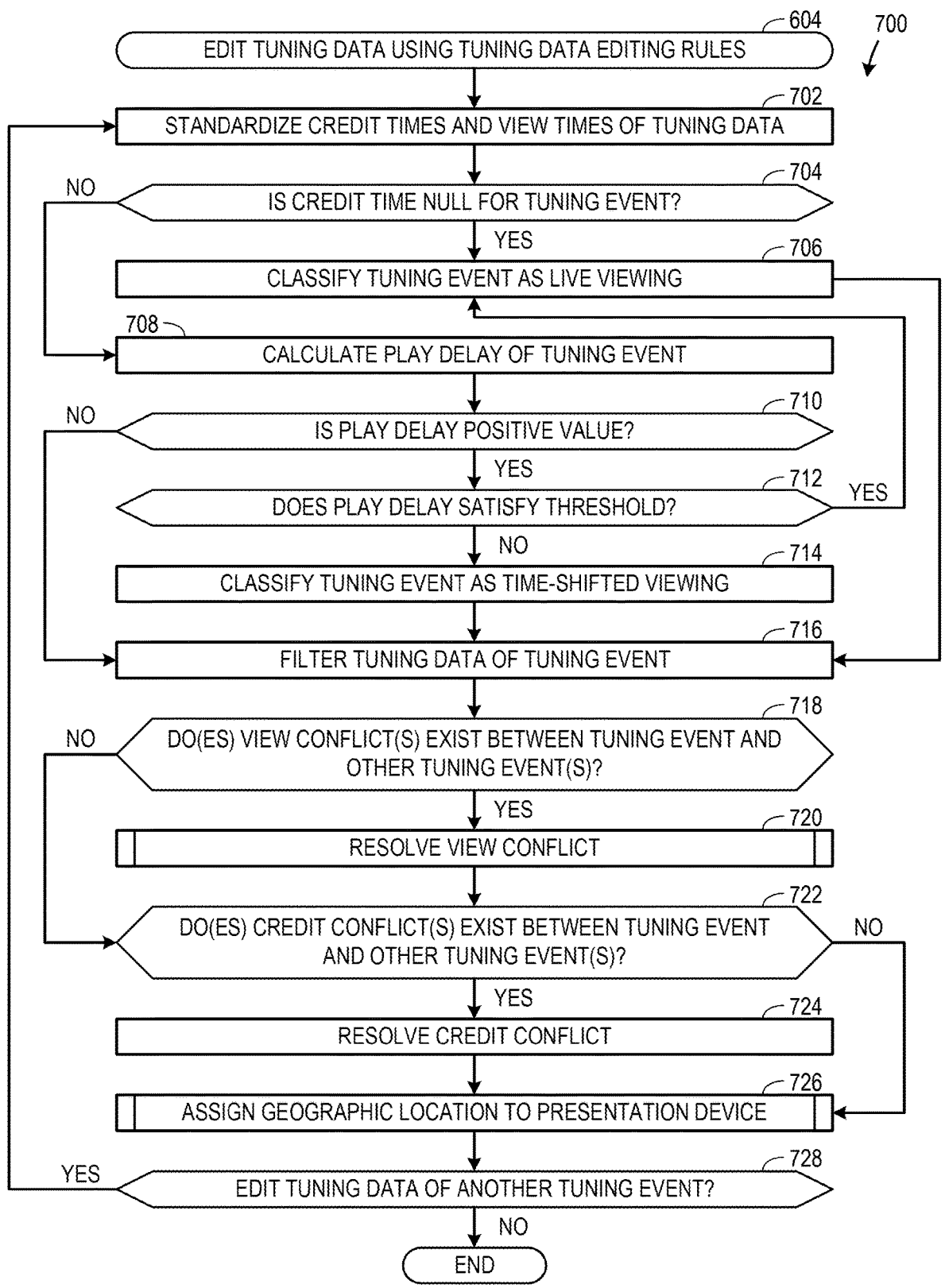

FIG. 7 is a flowchart representative of example machine readable instructions and/or example operations 700 that may be executed and/or instantiated by processor circuitry to implement the tuning data editing circuitry 224 to edit tuning data corresponding to tuning events monitored via ACR. The example operations 700 describe block 604 of FIG. 6. Although the operations 700 of FIG. 7 are described to resolve view conflict(s) and credit conflict(s) between two conflicting tuning events, the example operations 700 can be implemented to resolve view/credit conflict(s) between two or more conflicting tuning events. The machine readable instructions and/or the operations 700 of FIG. 7 begin at block 702, at which the computing device 104 standardizes the credit times and the view times of the tuning data of the tuning event. For example, when the tuning data editing circuitry 224 obtains the tuning data of the tuning events, the data preprocessing circuitry 226 standardizes the timestamps of credit start times, credit end times, view start times, and view end times corresponding to the tuning events. The data preprocessing circuitry 226 standardizes the credit times and the view times such that they resemble a format (e.g., ISO 8601) readable by the computing device 104 or another device (e.g., server, database, computing facility, etc.). In some examples, in conjunction with standardizing the timestamps of the tuning events, the data preprocessing circuitry 226 also obtains additional tuning data of the tuning events (e.g., station code, application service ID, etc.), determines whether the station code of a tuning event is equal to the station code of a preceding tuning event, and, when the station codes are the same, merges the tuning event with the preceding tuning event.

At block 704, the computing device 104 determines whether the credit time is null for the tuning event. For example, the data preprocessing circuitry 226 determines whether the credit time is available for the tuning event, and when the credit time is available, obtains the credit time from the presentation device 102 or another example device.

When the data preprocessing circuitry 226 determines that the credit time is null for the tuning event, then the operations 700 proceed to block 706 where the computing device 104 classifies the tuning event as live viewing. For example, the data preprocessing circuitry 226 generates metadata corresponding to the tuning event that is indicative of a live viewing classification. The data preprocessing circuitry 226 can also set the credit time equal to the view time of the tuning event.

When the data preprocessing circuitry 226 determines that the credit time is non-null for the tuning event, then the operations 700 proceed to block 708 where the computing device 104 calculates the play delay of the tuning event. For example, the data preprocessing circuitry 226 determines a difference between the view start time and the credit start time of the tuning event.

At block 710, the computing device 104 determines whether the play delay is a positive value. For example, the data preprocessing circuitry 226 determines whether the play delay is less than zero. When the data preprocessing circuitry 226 determines that the play delay is a negative value, then the operations 700 proceed to block 716 where the computing device 104 filters the tuning event.

When the data preprocessing circuitry 226 determines that the play delay is a positive value, then the operations 700 proceed to block 712 where the computing device 104 determines whether the play delay satisfies a first threshold (e.g., ten seconds, 30 seconds, 40 seconds, etc.). For example, the data preprocessing circuitry 226 determines whether the positive play delay value is less than the first threshold. When the data preprocessing circuitry 226 determines that the play delay does satisfy the first threshold, then the operations 700 return to block 706 where the computing device 104 classifies the tuning event as live viewing.

When the data preprocessing circuitry 226 determines that that the play delay does not satisfy the first threshold, then the operations 700 proceed to block 714 where the computing device 104 classifies the tuning event as time-shifted viewing (TSV). For example, the data preprocessing circuitry 226 generates metadata corresponding to the tuning event that is indicative of a TSV classification.

At block 716, the computing device 104 filters the tuning event. For example, the data processing circuitry 228 determines whether the tuning event is illogical. The data processing circuitry 228 determines whether the view start time is equal to the view end time, whether the view start time is after the view end time, or whether the credit start time is after the credit end time. When at least one of the above criteria is determined to be true, then the data processing circuitry 228 discards the tuning event. Also, when the play delay is a negative value, the data processing circuitry 228 determines whether the play delay satisfies a second threshold (e.g., −300 seconds, −240 seconds, −120 seconds, etc.). When the play delay does not satisfy the second threshold, then the data processing circuitry 228 discards the tuning event. When the play delay does satisfy the second threshold, then the data processing circuitry 228 retains the tuning event and classifies the tuning data as live viewing.

At block 718, the computing device 104 determines whether one or more view conflicts exist between the tuning event and one or more other tuning events. For example, the view conflict resolution circuitry 230 determines whether a first tuning event and a second tuning event are associated with the same presentation device (e.g., presentation device 102), whether a view start time of the first tuning event occurs before a view end time of the second tuning event, whether the view end time of the first tuning event occurs after the view start time of the second tuning event, and whether a tuning event ID of the first tuning event is inequal to the tuning event ID of the second tuning event. When the above criteria are true, then the view conflict resolution circuitry 230 determines that the view conflict does exist, and the example operations 700 proceeds to block 720 where the computing device 104 resolves the view conflict, as described below in reference to FIG. 8.

When the view conflict resolution circuitry 230 determines that the view conflict does not exist, then the operations 700 proceed to block 722 where the computing device 104 determines whether one or more credit conflicts exist between the tuning event and one or more other tuning events. For example, the credit conflict resolution circuitry 232 determines whether the first tuning event and the second tuning event are associated with the same presentation device (e.g., presentation device 102), whether a credit start time of the first tuning event occurs before a credit end time of the second tuning event, whether the credit end time of the first tuning event occurs after the credit start time of the second tuning event, whether the station code of the first tuning event is equal to the station code of the second tuning event, and whether the view time of the second tuning event is consecutive to the view time of the first tuning event (e.g., without the view time of another tuning event occurring between the view times of the first and second tuning events). The example credit conflict resolution circuitry 232 also determines whether a viewing gap exists between the view end time of the first tuning event and the view start time of the second event.

When the above criteria are true, and when the viewing gap satisfies a third threshold (e.g., one second, five seconds, ten seconds, etc.), then the credit conflict resolution circuitry 232 determines that the credit conflict does exist between the first and second tuning events, and operations 700 proceed to block 724 where the computing device 104 resolves the credit conflict. For example, the credit conflict resolution circuitry 232 removes the credit overlap period from the second tuning event. The credit conflict resolution circuitry 232 can adjust the credit start time of the second tuning event to match the credit end time of the first tuning event.

When the credit conflict resolution circuitry 232 determines that the credit conflict does not exist between the first and second tuning events, then operations 700 proceed to block 726 where the computing device 104 assigns a geographic location to the presentation device 102. Details of the operations of block 726 are described below in reference to FIG. 12.

At block 728, the computing device 104 determines whether tuning data of another tuning event is to be edited. For example, the data preprocessing circuitry 226 can determine whether additional tuning data corresponding to other tuning events have been obtained or are stored on the computing device 104 in queue to be edited. When the data preprocessing circuitry 226 determines that additional tuning data is to be edited, then the example operations 700 return to block 702 where the computing device preprocesses the other tuning event. When the data preprocessing circuitry 226 determines that additional tuning data is not to be edited, then the example operations 700 end.

Figure 8:
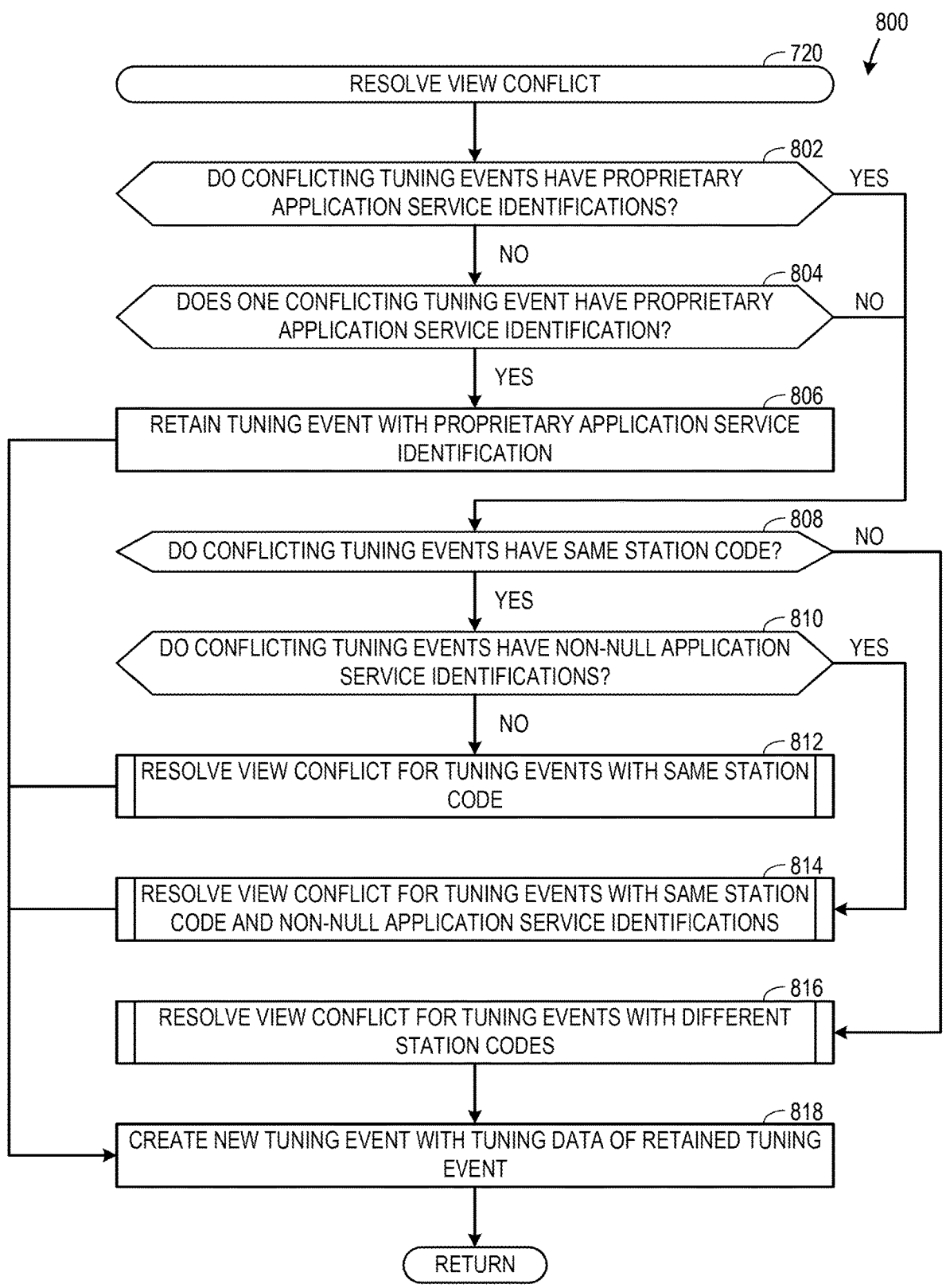

FIG. 8 is a flowchart representative of example machine readable instructions and/or example operations 800 that may be executed and/or instantiated by processor circuitry to implement the tuning data editing circuitry 224 to resolve the view conflict that the view conflict resolution circuitry 230 determined to exist. The example operations 800 describe block 720 of FIG. 7. Although the operations 800 of FIG. 8 are described to resolve view conflict(s) between two conflicting tuning events, the example operations 800 can be implemented to resolve view conflict(s) between two or more conflicting tuning events. The machine readable instructions and/or the operations 800 of FIG. 8 begin at block 802, at which the computing device 104 determines whether the first and second tuning events have proprietary application service IDs. For example, the view conflict resolution circuitry 230 reads the application service IDs of the first and second tuning events and compares the IDs against a database (e.g., database 206) of proprietary application service IDs to determine whether there is a match. When the view conflict resolution circuitry 230 determines that both the first tuning event and the second tuning event have proprietary application service IDs, then the operations 800 proceed to block 808.

When the view conflict resolution circuitry 230 determines that both the first and the second tuning events do not have proprietary application service IDs, then the operations 800 proceed to block 804 where the computing device 104 determines whether one of the first or second tuning events have proprietary application service IDs. For example, the view conflict resolution circuitry 230 compares the application service IDs of the first and second tuning events to the database of proprietary application service IDs to find a match. When the view conflict resolution circuitry 230 determines that neither the first tuning event nor the second tuning event have proprietary application service IDs, then the operations 800 proceed to block 808.

When the view conflict resolution circuitry 230 determines that one of the first tuning event or the second tuning event does have a proprietary application service ID, then the operations 800 proceed to block 806 where the computing device 104 retains the tuning event with the proprietary application service ID. For example, the view conflict resolution circuitry 230 saves the tuning data of the winner event to be included in a new tuning event for the conflicting view period.

At block 808, the computing device 104 determines whether the first tuning event and the second tuning event have the same station code. For example, the view conflict resolution circuitry 230 compares the station codes of the first and second tuning events to determine whether the station codes (e.g., numerical identifiers) are equal. When the view conflict resolution circuitry 230 determines that the first and second tuning events do not have the same station code, then the operations 800 proceed to block 816 where the computing device 104 (e.g., the view conflict resolution circuitry 230) resolves the view conflict between conflicting tuning events with different station codes, as described further below in reference to FIG. 11.

When the view conflict resolution circuitry 230 determines that the first and second tuning events do have the same station code, then the operations 800 proceed to block 810 where the computing device 104 determines whether one or more of the conflicting tuning events have non-null application service IDs. For example, the view conflict resolution circuitry 230 searches the application service IDs of the first and second tuning events and determines whether the application service IDs return "NULL." When the view conflict resolution circuitry 230 determines that the tuning events have non-null application service IDs, then the operations 800 proceed to block 814 where the computing device 104 (e.g., the view conflict resolution circuitry 230) resolves the view conflict between conflicting tuning events with the same station code and non-null application service IDs, as described further below in reference to FIG. 10.

When the view conflict resolution circuitry 230 determines that one or more of the tuning events have null application service IDs, then the operations 800 proceed to block 812 where the computing device 104 (e.g., the view conflict resolution circuitry 230) resolves the view conflict between conflicting tuning events with the same station code, as described further below in reference to FIG. 9.

At block 818, the computing device 104 creates a new tuning event with the tuning data of the retained tuning event. For example, the view conflict resolution circuitry 230 creates a third tuning event with tuning data corresponding to the winner event determined at block 812, block 814, or block 816. The view conflict resolution circuitry 230 also adjusts the view time and/or the credit time of the tuning events (e.g., the first and second tuning events) so as not to conflict with the new view time and credit time of the third tuning event. The view conflict resolution circuitry 230 also adjusts or discards a portion of the tuning data (e.g., the view and/or credit times) that was included in the view conflict and/or that would conflict with the third tuning event. When the view conflict resolution circuitry 230 creates the new tuning event, the example operations 800 return to block 722 of FIG. 7.

Figure 9:
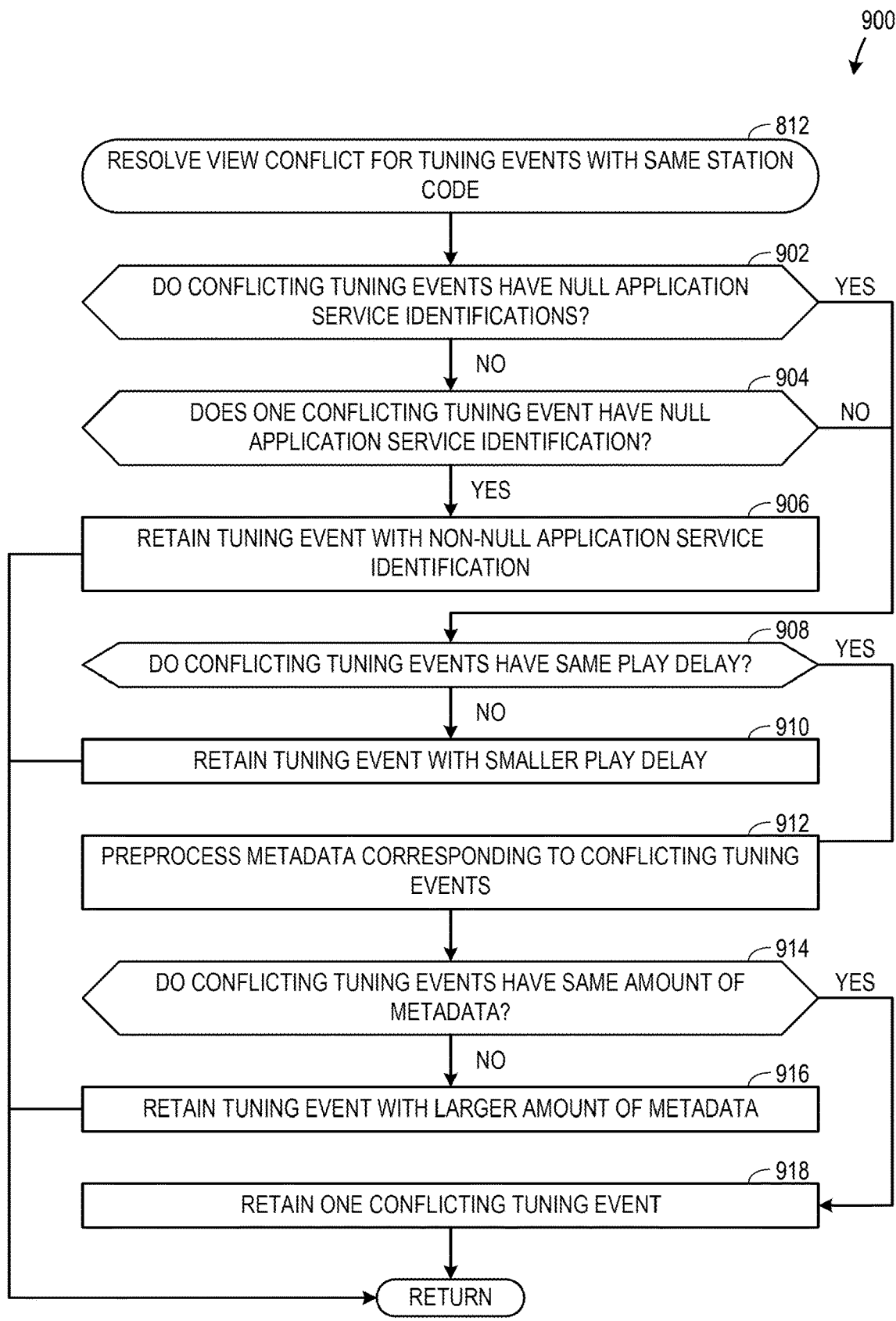

FIG. 9 is a flowchart representative of example machine readable instructions and/or example operations 900 that may be executed and/or instantiated by processor circuitry implement the tuning data editing circuitry 224 to resolve the view conflict for tuning events with the same station code. The example operations 900 describe block 810 of FIG. 8. Although the operations 900 of FIG. 9 are described to resolve view conflict(s) between two conflicting tuning events, the example operations 900 can be implemented to resolve view conflict(s) between two or more conflicting tuning events. The machine readable instructions and/or the operations 900 of FIG. 9 begin at block 902, at which the computing device 104 determines whether both the first and second tuning events have null application service IDs. For example, the view conflict resolution circuitry 230 calls the application service IDs of the first and second tuning events and determines whether the IDs return as null. When the view conflict resolution circuitry 230 determines that both the first tuning event and the second tuning event have null application service IDs, then the operations 900 proceed to block 908.

When the view conflict resolution circuitry 230 determines that both the first and the second tuning events do not have null application service IDs, then the operations 900 proceed to block 904 where the computing device 104 determines whether one of the first or second tuning events has a null application service IDs. For example, the view conflict resolution circuitry 230 calls the application service IDs of the first and second tuning events and determines whether the IDs return as null. When neither the first tuning event nor the second tuning event have null application service IDs, then the operations 900 proceed to block 908.

When one of the first tuning event or the second tuning event has a null application service ID, then the operations 900 proceed to block 906 where the computing device 104 retains the tuning event with the non-null application service ID. For example, the view conflict resolution circuitry 230 saves the tuning data of the winner event to be included in a new tuning event for the conflicting view period, and the operations 900 return to block 818 of FIG. 8.

At block 908, the computing device 104 determines whether the conflicting tuning events have the same play delay. For example, the view conflict resolution circuitry 230 calls for the play delays of the first and second tuning events and determines whether the two values are equal. When the play delays are not the same, the operations 900 proceed to block 910, where the computing device 104 retains the tuning event with the smaller of play delay. For example, the view conflict resolution circuitry 230 determines which play delay is latest in numerical order and retains the corresponding tuning event, and the operations 900 return to block 818 of FIG. 8.

When the play delays are the same between the conflicting tuning events, then the operations 900 proceed to block 912 where the computing device 104 preprocesses metadata corresponding to the first tuning event and the second tuning event. For example, the data preprocessing circuitry 226 obtains, organizes, and/or stores content metadata associated with the first and second tuning events from a database (e.g., database 206) maintained and/or populated by a network provider.

At block 914, the computing device 104 determines whether the conflicting tuning events have the same amount of metadata. For example, when the view conflict resolution circuitry 230 determines that the number of populated metadata categories corresponding to the first tuning event equals the number of populated metadata categories corresponding to the second tuning event, then the operations 900 proceed to block 918.

When the view conflict resolution circuitry 230 determines that the number of populated metadata categories corresponding to the first tuning event does not equal the number of populated metadata categories corresponding to the second tuning event, then the operations 900 proceed to block 916 where the computing device 104 retains the tuning event with the larger amount of associated metadata. For example, the view conflict resolution circuitry 230 declares the winner event and saves the associated tuning data and metadata to be used to create a new tuning event for the conflicting view time period. When the winner event is retained, the example operations 900 return to block 818 of FIG. 8.

At block 918, the computing device 104 retains one of the tuning events associated with the view conflict. For example, since the station codes, application service IDs, and play delays are the same, then the conflicting tuning events are technically also the same. Thus, the view conflict resolution circuitry 230 declares a random one of the conflict tuning events (e.g., the first or second tuning event) as the winner event. Additionally or alternatively, a third party such as a back office facility, technician, analyst, company policy, etc. can determine which of the conflicting tuning events is to be declared the winner event. When the winner event is retained, the example operations 900 return to block 818 of FIG. 8.

Figure 10:
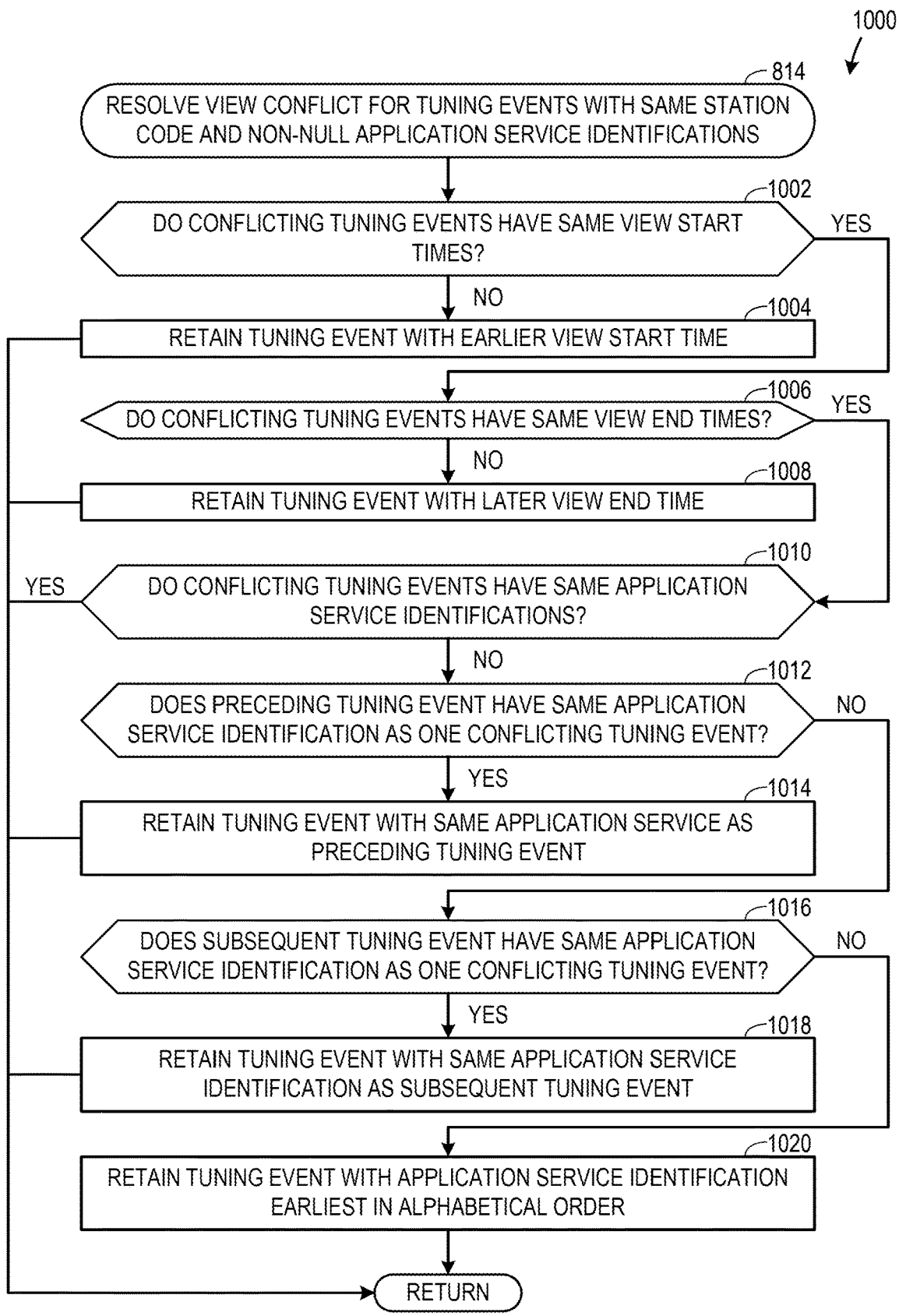

FIG. 10 is a flowchart representative of example machine readable instructions and/or example operations 1000 that may be executed and/or instantiated by processor circuitry to implement the tuning data editing circuitry 224 to resolve the view conflict for tuning events with the same station code, non-null application service IDs, and the same play delay. The example operations 1000 describe block 814 of FIG. 8. Although the operations 1000 of FIG. 10 are described to resolve view conflict(s) between two conflicting tuning events, the example operations 1000 can be implemented to resolve view conflict(s) between two or more conflicting tuning events. The machine readable instructions and/or the operations 1000 of FIG. 10 begin at block 1002, at which the computing device 104 determines whether the conflicting tuning events have the same view start time. For example, the view conflict resolution circuitry 230 determines whether the view start time of the first tuning event equals the view start time of the second tuning event. When the view conflict resolution circuitry 230 determines that the view start times of the conflicting tuning events are not equal, then the operations 1000 proceed to block 1004 where the computing device 104 retains the tuning event with the earlier view start time. For example, the view conflict resolution circuitry 230 saves the tuning data corresponding the winner event to be used to create a new tuning event for the conflicting view time period. The example operations 1000 then return to block 818 of FIG. 8.

When the view conflict resolution circuitry 230 determines that the view start times of the conflicting tuning events are equal, then the operations 1000 proceed to block 1006 where the computing device 104 determines whether the conflicting tuning events have the same view end times. For example, the view conflict resolution circuitry 230 determines whether the view end time of the first tuning event equals the view end time of the second tuning event. When the view end times of the conflicting tuning events are not equal, then the operations 1000 proceed to block 1008 where the computing device 104 retains the tuning event with the later view end time. For example, the view conflict resolution circuitry 230 saves the tuning data corresponding the winner event to be used to create a new tuning event for the conflicting view time period. The example operations 1000 then return to block 818 of FIG. 8.

When the view end times of the conflicting tuning events are equal, then the operations 1000 proceed to block 1010 where the computing device 104 determines whether the conflicting tuning events have the same application service IDs. For example, the view conflict resolution circuitry 230 determines whether the application service ID of the first tuning event equals the application service ID of the second tuning event. When the application service IDs of the conflicting tuning events are the same, the operations 1000 return to block 818 of FIG. 8.

When the application service IDs of the conflicting tuning events are not the same, the operations 1000 proceed to block 1012 where the computing device 104 determines whether the preceding tuning event has the same application service ID as one of the conflicting tuning events. For example, the view conflict resolution circuitry 230 calls for the application service ID of the tuning event with a view time that comes before the view time of the first and/or the second tuning event(s) and determines whether the application service ID matches the application service ID of the first or second tuning events. When the application service ID of the preceding tuning event matches the application service ID of one of the first or second tuning events, then operations 1000 proceed to block 1014 where the computing device 104 retains the tuning event with the same application service ID as the preceding tuning event. When the winner event is retained at block 1014, then the operation 1000 returns to block 818 of FIG. 8.

When the application service ID of the preceding tuning event is not the same as the first or second tuning event, then operations 1000 proceed to block 1016 where the computing device 104 determines whether the subsequent tuning event has the same application service ID as one of the conflicting tuning events. For example, the view conflict resolution circuitry 230 calls for the application service ID of the tuning event with a view time that comes after the view time of the first and/or the second tuning event(s) and determines whether the application service ID matches the application service ID of the first or second tuning events. When the application service ID of the subsequent tuning event matches the application service ID of one of the first or second tuning events, then operations 1000 proceed to block 1018 where the computing device 104 retains the tuning event with the same application service ID as the subsequent tuning event. When the winner event is retained at block 1018, then the operation 1000 returns to block 818 of FIG. 8.

When the application service ID of the subsequent tuning event is not the same as the first or second tuning event, then the operations 1000 proceed to block 1020 where the computing device 104 retains the tuning event with the corresponding application service ID that is earliest in alphabetical order. For example, the view conflict circuitry 230 saves the winner event with an application service ID beginning with the letter "A" when the application service ID of the other tuning event begins with the letter "B". After block 1020, the operations 1000 return to block 818 of FIG. 8.

Figure 11:
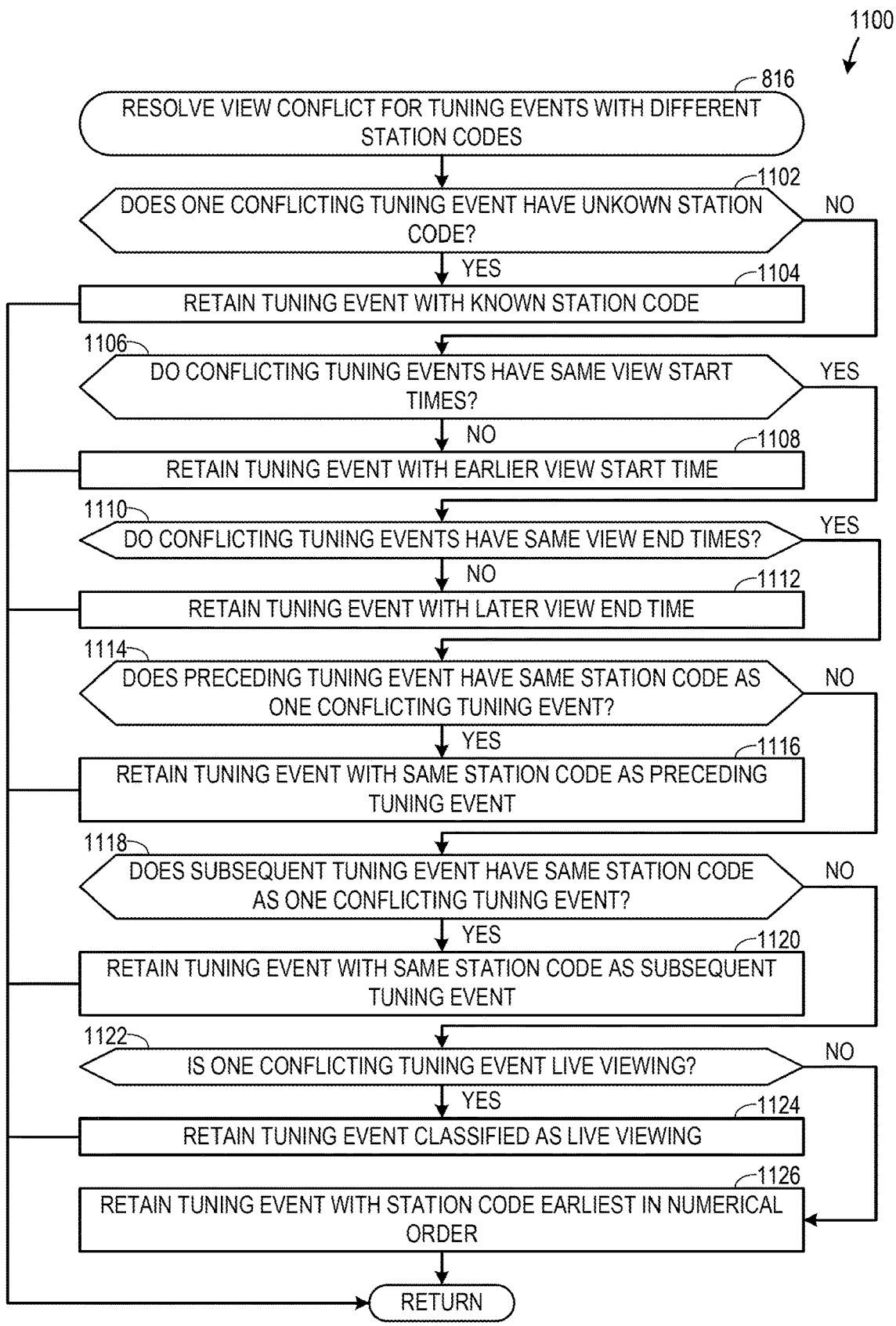

FIG. 11 is a flowchart representative of example machine readable instructions and/or example operations 1100 that may be executed and/or instantiated by processor circuitry to implement the tuning data editing circuitry 224 to resolve the view conflict for tuning events with different station codes and null application service IDs. The example operations 1100 describe block 816 of FIG. 8. Although the operations 1100 of FIG. 11 are described to resolve view conflict(s) between two conflicting tuning events, the example operations 1100 can be implemented to resolve view conflict(s) between two or more conflicting tuning events. The machine readable instructions and/or the operations 1100 of FIG. 11 begin at block 1102, at which the computing device 104 determines whether one of the conflicting tuning events has an unknown station code. For example, the view conflict resolution circuitry 230 determines whether either of the station codes of the first or second tuning events returns a null value. When the view conflict resolution circuitry 230 determines that one of the first or the second tuning events has a known station code, then the operations 1100 proceed to block 1104 where the computing device 104 retains the tuning event with known station code. For example, the view conflict resolution circuitry 230 saves the tuning data corresponding the winner event to be used to create a new tuning event for the conflicting view time period. The example operations 1100 then return to block 818 of FIG. 8.

When the view conflict resolution circuitry 230 determines that the first and the second tuning events have known and different station codes, then the operations 1100 proceed to block 1106 where the computing device 104 determines whether the conflicting tuning events have the same view start times. For example, the view conflict resolution circuitry 230 determines whether the view start time of the first tuning event equals the view start time of the second tuning event. When the view start times of the conflicting tuning events are not equal, then the operations 1100 proceed to block 1108 where the view conflict resolution circuitry 230 retains the tuning event with the earlier view start time. The example operations 1100 then return to block 818 of FIG. 8.

When the view conflict resolution circuitry 230 determines that the first and the second tuning events have the same view start times, then the operations 1100 proceed to block 1106 where the computing device 104 determines whether the conflicting tuning events have the same view end times. For example, the view conflict resolution circuitry 230 determines whether the view end time of the first tuning event equals the view end time of the second tuning event. When the view end times of the conflicting tuning events are not equal, then the operations 1100 proceed to block 1112 where the view conflict resolution circuitry 230 retains the tuning event with the later view end time. The example operations 1100 then return to block 818 of FIG. 8.

When the view end times of the conflicting tuning events are equal, then the operations 1100 proceed to block 1114 where the computing device 104 determines whether the preceding tuning event has the same station code as one of the conflicting tuning events. For example, the view conflict resolution circuitry 230 calls for the station code of the tuning event with a view time that comes before the view time of the first and/or the second tuning event(s) and determines whether the station code matches the station code of the first or second tuning events. When the station code of the preceding tuning event matches the station code of one of the first or second tuning events, then operations 1100 proceed to block 1116 where the computing device 104 retains the tuning event with the same station code as the preceding tuning event. When the winner event is retained at block 1116, then the operation 1100 returns to block 818 of FIG. 8.

When the station code of the preceding tuning event is not the same as the first or second tuning event, then operations 1100 proceed to block 1118 where the computing device 104 determines whether the subsequent tuning event has the same station code as one of the conflicting tuning events. For example, the view conflict resolution circuitry 230 calls for the station code of the tuning event with a view time that comes after the view time of the first and/or the second tuning event(s) and determines whether the station code matches the station code of the first or second tuning events. When the station code of the subsequent tuning event matches the station code of one of the first or second tuning events, then operations 1100 proceed to block 1120 where the computing device 104 retains the tuning event with the same station code as the subsequent tuning event. When the winner event is retained at block 1120, then the operation 1100 returns to block 818 of FIG. 8.

When the station code of the subsequent tuning event is not the same as the first or second tuning event, then the operations 1100 proceed to block 1122 where the computing device 104 determines whether one of the conflicting tuning events is classified as live viewing. For example, the view conflict resolution circuitry 230 determines whether a viewing classification of the first or second tuning event is indicative of live viewing. When one of the conflicting tuning events is classified as live viewing, then the operations 1100 proceed to block 1124 where the computing device 104 retains the tuning event with the live viewing classification, after which the operations 1100 return to block 818 of FIG. 8.

When one of the conflicting tuning events is not classified as live viewing, then the operations 1100 proceed to block 1126 where the computing device 104 retains the tuning event with the corresponding station code that is earliest in numerical order. For example, the view conflict circuitry 230 saves the winner event with a station code beginning with the number "1" when the station code of the other tuning event begins with the number "2". After block 1126, the operations 1100 return to block 818 of FIG. 8.

Figure 12:
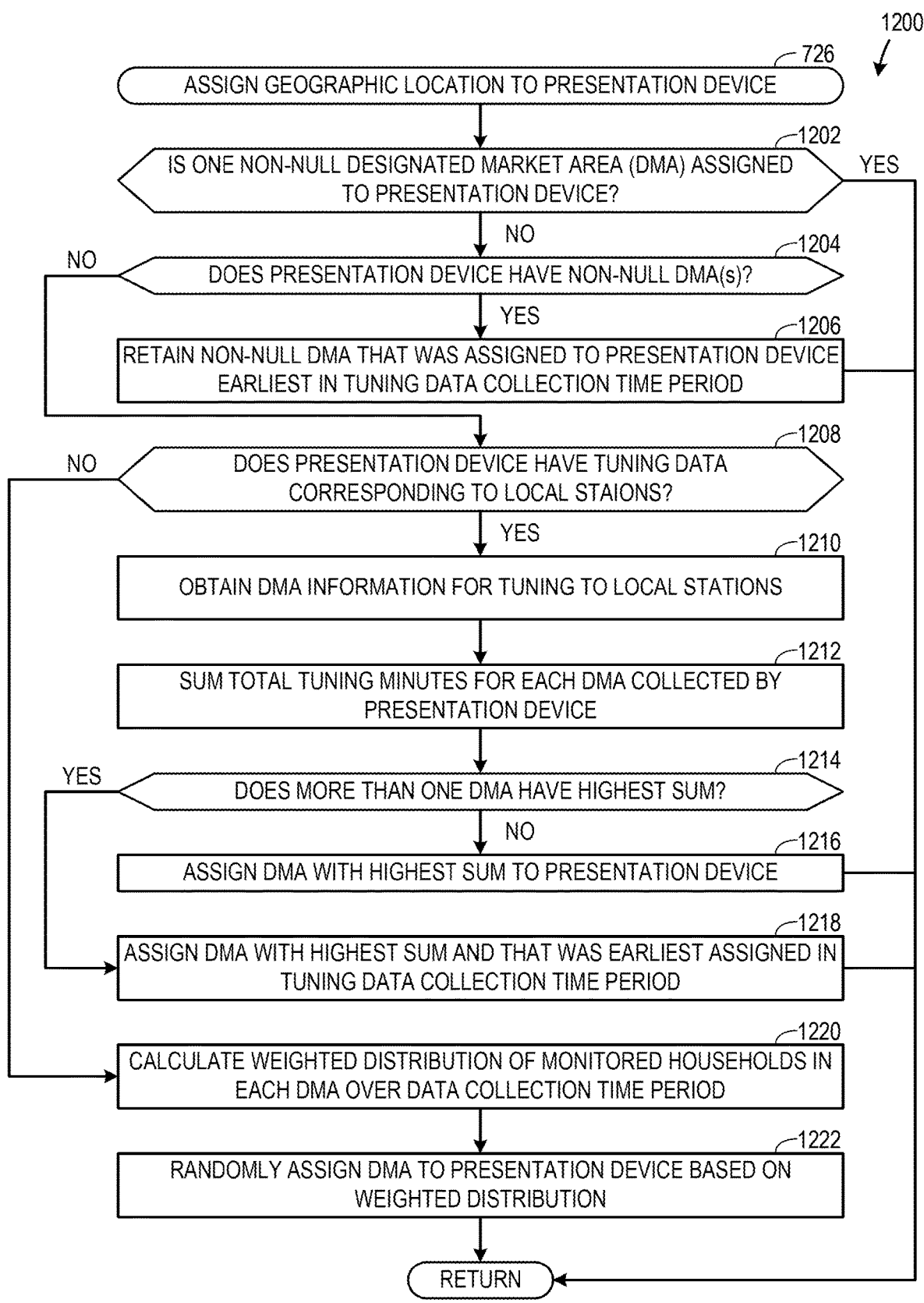

FIG. 12 is a flowchart representative of example machine readable instructions and/or example operations 1200 that may be executed and/or instantiated by processor circuitry to implement the tuning data editing circuitry 224 to assign a geographic location to the presentation device 102. The example operations 1200 describe block 726 of FIG. 7. Although the operations 1200 of FIG. 12 are described to assign a geographic location to the presentation device 102, the example operations 1200 can be implemented to assign a geographic location to another presentation device. The machine readable instructions and/or the operations 1200 of FIG. 12 begin at block 1202, at which the computing device 104 determines whether one non-null designated market area (DMA) is assigned to the presentation device 102. For example, the geographic location determination circuitry 234 determines whether a count of assigned DMAs equals one and whether the value of the assigned DMA(s) returns as null. When the view conflict resolution circuitry 230 determines that only one known DMA is assigned to the presentation device 102, then the operations 1200 return to block 728 of FIG. 7.

When the geographic location determination circuitry 234 that more than one DMA has been assigned to the presentation device 102 or that no DMAs have been assigned (e.g., the DMA returns as null), then the operations 1200 proceed to block 1204 where the computing device 104 determines whether the presentation device 102 has non-null DMA assignment(s). For example, the geographic location determination circuitry 234 calls the DMA assignment(s) of the presentation device 102 and determines whether the DMA(s) return a null value. When the geographic location determination circuitry 234 determines that the DMA of the presentation device 102 is null, then the operations 1200 proceed to block 1208.

When the geographic location determination circuitry 234 determines that the presentation device 102 has multiple non-null DMA assignments, then the computing device 104 retains the non-null DMA that was assigned to the presentation device 102 earliest in a tuning data collection time period. For example, the geographic location determination circuitry 234 detects timestamps corresponding to the DMA assignments of the presentation device 102, isolates the DMA assignments based on the contiguous timeframe of the tuning data collection period, and determines which of the timestamps is earliest. When the earliest DMA is determined, then the geographic location determination circuitry 234 discards the other DMAs and retains the earliest DMA assignment for the presentation device 102, at which point the operations 1200 return to block 728 of FIG. 7.

At block 1208, when the geographic location determination circuitry 234 determines that the presentation device 102 has a null DMA assignment, the computing device 104 determines whether the presentation device 102 has collected tuning data corresponding to local affiliate stations. For example, the geographic location determination circuitry 234 compares the station codes of the tuning data collected by the presentation device 102 over the contiguous timeframe and determines if the station codes match a list of station codes that correspond to local stations. When the geographic location determination circuitry 234 determines that the presentation device 102 has not collected tuning data corresponding to local stations, then the operations proceed to block 1220.

When the geographic location determination circuitry 234 determines that the presentation device 102 has collection tuning data of local stations, then operations 1200 proceed to block 1210 where the computing device 104 obtains the market of origin information for the local affiliate stations. For example, the geographic location determination circuitry 234 references a database (e.g., database 206) that includes local station codes and corresponding market region information of the local stations such as the country, state, county, and/or coverage area.

At block 1212, the computing device 104 sums the total tuning minutes for each market of origin collected by the presentation device 102. For example, the geographic location determination circuitry 234 sums the tuning minutes for each local station code associated with a market of origin. There may be tuning data corresponding multiple markets of origin. There may also be tuning data collected for multiple station codes associated with one market of origin.

At block 1214, the computing device 104 determines whether more than one DMA have the highest sum of tuning minutes. For example, the geographic location determination circuitry 234 compares the sums of different tuning minutes, determines which sum is the highest, and then determines whether another sum equals that value. When the geographic location determination circuitry 234 determines that only one sum of tuning minutes is the highest, then the operations 1200 proceed to block 1216 where the computing device assigns the DMA with the highest sum to the presentation device 102. For examples, the geographic location determination circuitry 234 replaces the null DMA value with the DMA corresponding to the local affiliate stations with the highest sum of tuning minutes. The operations the return to block 728 of FIG. 7.

When the geographic location determination circuitry 234 determines that more than one DMA have the highest sum of tuning minutes, then the operations 1200 proceed to block 1218 where the computing device 104 assigns the DMA with the highest sum and that was the earliest DMA assigned to the presentation device 102 in the tuning data collection time period. For example, the geographic location determination circuitry 234 compares timestamps of the assignments of DMAs with the highest sums, determines which timestamp occurred earliest in the contiguous timeframe, and assigns the corresponding DMA to the presentation device 102. The operations 1200 then return to block 728 of FIG. 7.

When the geographic location determination circuitry 234 determines that the presentation device 102 has not collected tuning data corresponding to local stations, then the operations proceed to block 1220 where the computing device 104 calculates a distribution of monitored households based on the total sum of weights over the tuning data collection period. For example, the geographic location determination circuitry 234 determines the total sum of weights of monitored households for each DMA and calculates a distribution of those DMAs. At block 1222, the computing device 104 (e.g., the geographic location determination circuitry 234) randomly assigns a DMA to the presentation device 102 based on the weighted distribution. The operations 1200 then return to block 728 of FIG. 7.

Figure 13:
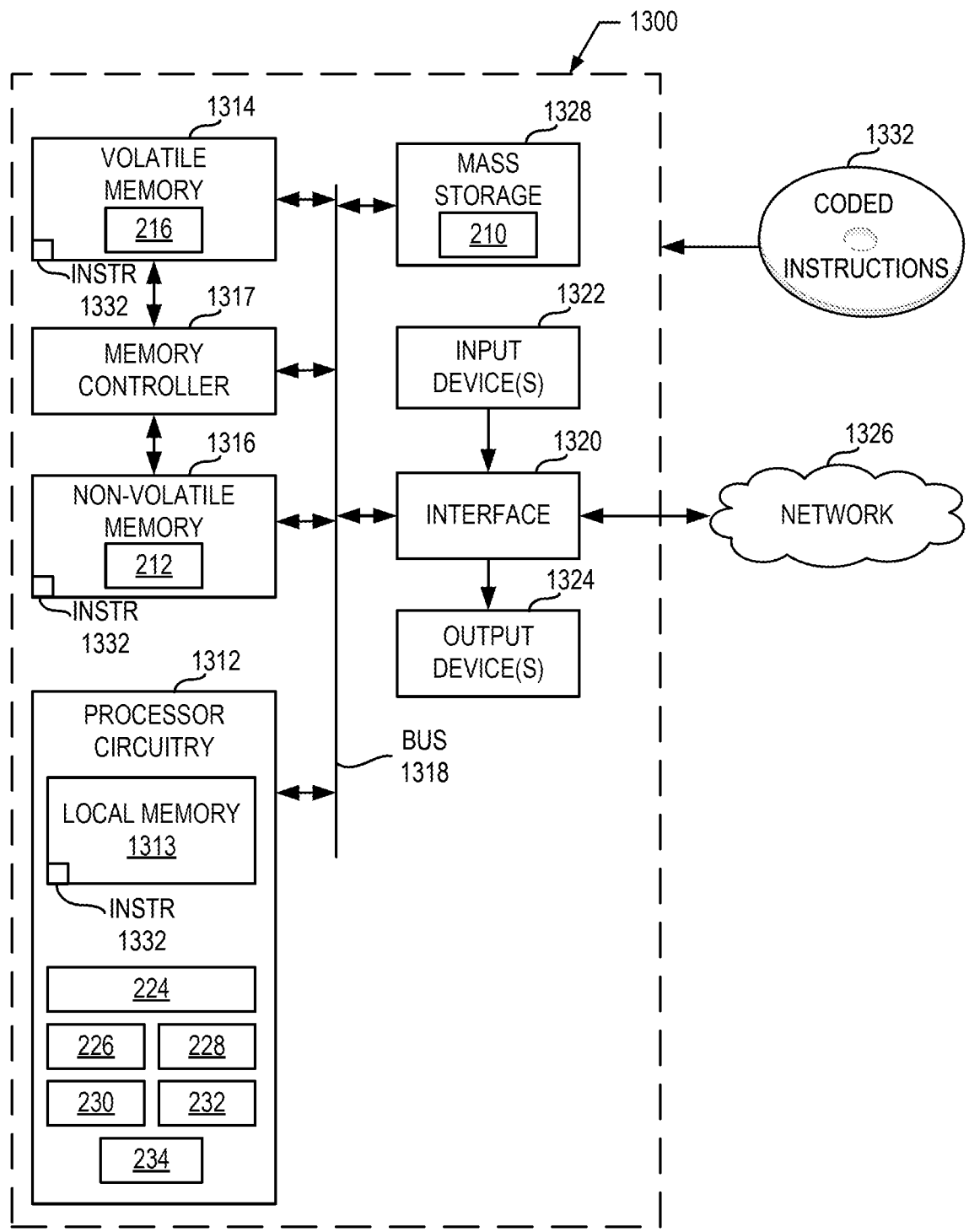
FIG. 13 is a block diagram of an example processing platform including processor circuitry structured to execute the example machine readable instructions and/or the example operations of FIGS. 6-12 to implement the computing device of FIG. 2.

FIG. 13 is a block diagram of an example processor platform 1300 structured to execute and/or instantiate the machine readable instructions and/or the operations of FIGS. 6-12 to implement the computing device 104 of FIG. 2. The processor platform 1300 can be, for example, a server, a personal computer, a workstation, a self-learning machine (e.g., a neural network), or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the data preprocessing circuitry 226, the data processing circuitry 228, the view conflict resolution circuitry 230, the credit conflict resolution circuitry 232, and the geographic determination circuitry 234.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 432, which may be implemented by the machine readable instructions of FIGS. 6-12, may be stored in the mass storage device 1328, in the volatile memory 1314, in the non-volatile memory 1316, and/or on a removable non-transitory computer readable storage medium such as a CD or DVD.

Figure 14:
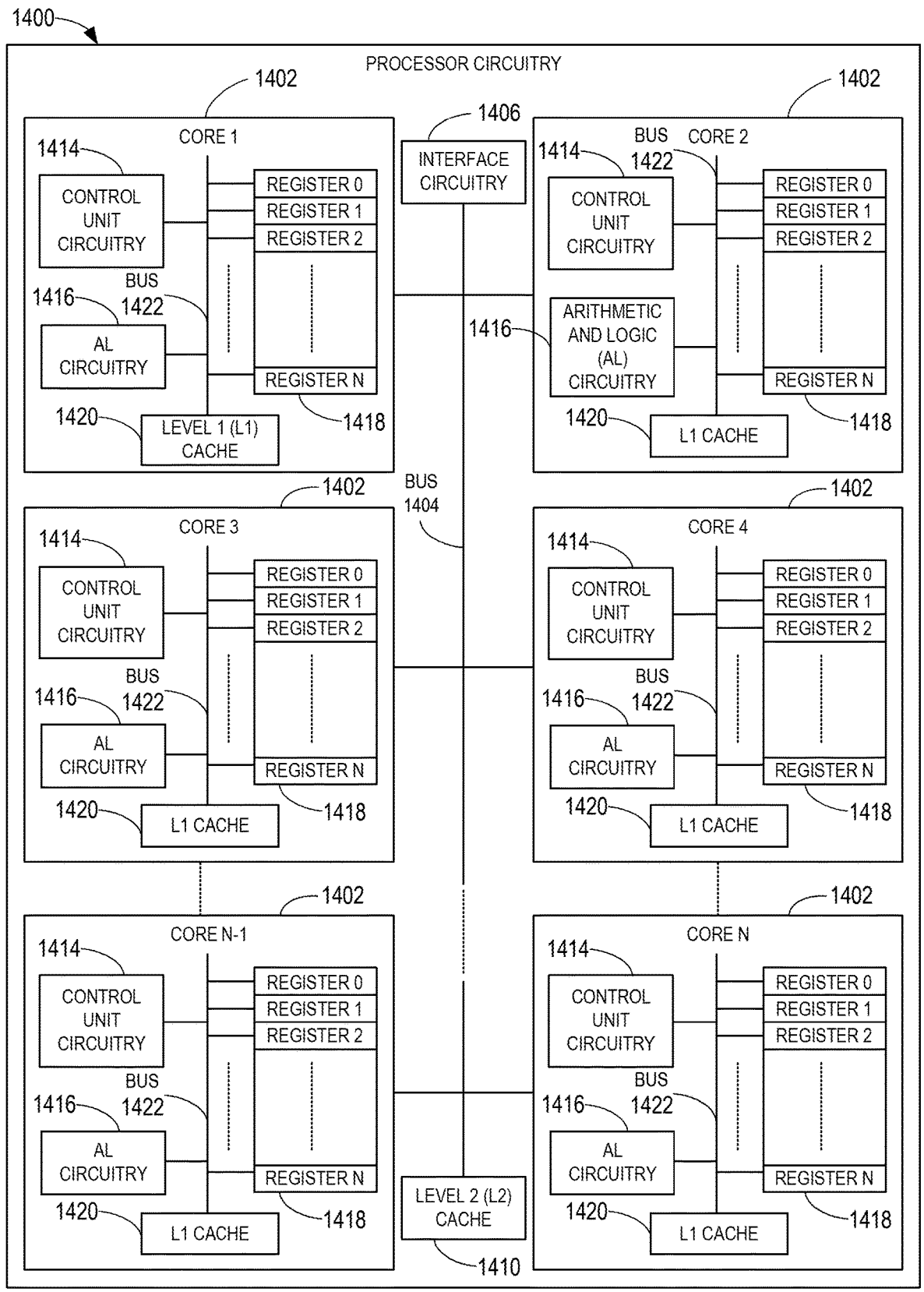
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowcharts of FIGS. 6-12 to effectively instantiate the tuning data editing circuitry 224 of FIG. 2 as logic circuits to perform the operations corresponding to those machine readable instructions. In some such examples, the tuning data editing circuitry 224 of FIG. 2 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 6-12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
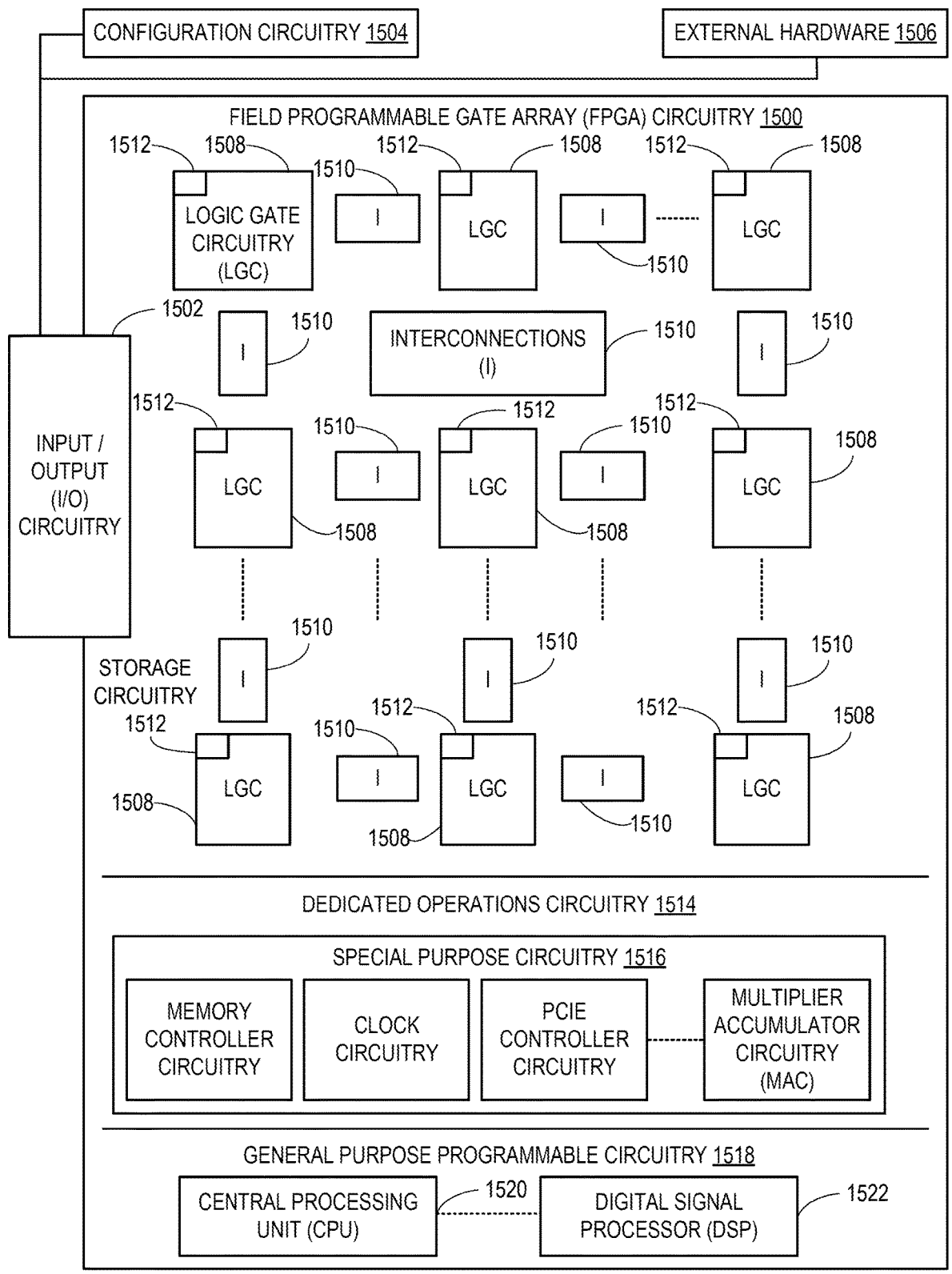
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 6-12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 6-12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 6-12. As such, the FPGA circuitry 1500 may be structured to effectively instantiate some or all of the machine readable instructions of the flowcharts of FIGS. 6-12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIGS. 6-12 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIGS. 6-12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 6-12 may be executed by one or more of the cores 1402 of FIG. 14, a second portion of the machine readable instructions represented by the flowcharts of FIGS. 6-12 may be executed by the FPGA circuitry 1500 of FIG. 15, and/or a third portion of the machine readable instructions represented by the flowcharts of FIGS. 6-12 may be executed by an ASIC. It should be understood that some or all of the tuning data editing circuitry 224 of FIG. 2 may, thus, be instantiated at the same or different times. Some or all of the circuitry may be instantiated, for example, in one or more threads executing concurrently and/or in series. Moreover, in some examples, some or all of the tuning data editing circuitry 224 of FIG. 2 may be implemented within one or more virtual machines and/or containers executing on the microprocessor.

In some examples, the processor circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
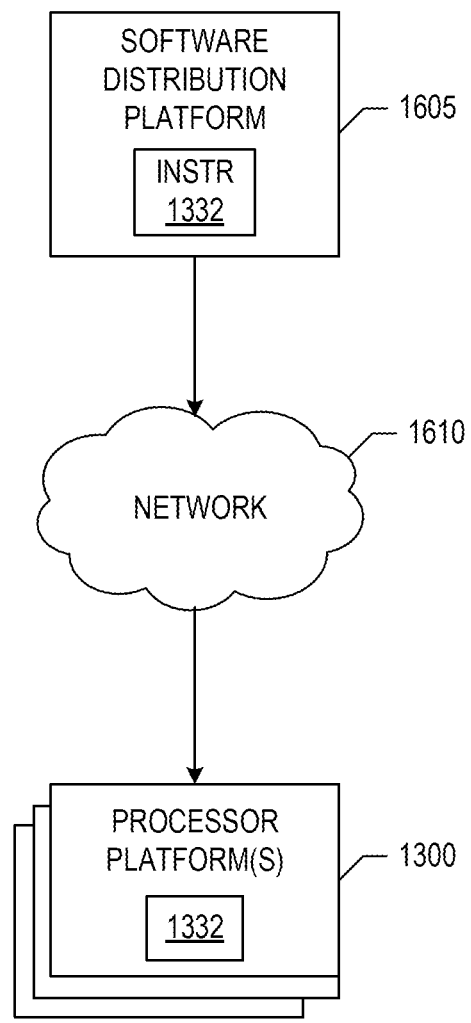
FIG. 16 is a block diagram of an example software distribution platform (e.g., one or more servers) to distribute software (e.g., software corresponding to the example machine readable instructions of FIGS. 6-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1332, which may correspond to the example machine readable instructions 600-1200 of FIGS. 6-12, as described above. The one or more servers of the example software distribution platform 1605 are in communication with an example network 1610, which may correspond to any one or more of the Internet and/or any of the example networks (e.g., network 104) described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions 600-1200 of FIGS. 6-12, may be downloaded to the example processor platform 1300, which is to execute the machine readable instructions 1332 to implement the computing device 104. In some examples, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that standardize, clean, and/or otherwise edit tuning data that is incomplete, illogical, and/or conflicting based on a set of tuning data editing rules. Disclosed systems, methods, apparatus, and articles of manufacture improve the efficiency of using a computing device by cleaning tuning data and providing the clean data to a computing device (e.g., back office facility, server(s), data processing center, cloud computing facility, etc.) such that the computing device can credit media to tuning events more efficiently and comprehensively without spending processing time and/or power parsing through illogical, unusable, and/or inconsistent data. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to edit tuning data collected via automated content recognition data are disclosed herein. Further examples and combinations thereof include the following:

Example 1 includes an apparatus to edit tuning data collected via automated content recognition, the apparatus comprising interface circuitry to obtain the tuning data to be edited from a presentation device, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate view conflict resolution circuitry to determine whether a time conflict exists between first tuning data corresponding to a first tuning event and second tuning data corresponding to a second tuning event, the first tuning data and the second tuning data collected by the presentation device via automated content recognition, the time conflict including a period of overlap associated with the first tuning event and the second tuning event, in response to determining that the time conflict exists, create a third tuning event based on the first tuning data or the second tuning data, the third tuning event created based on one or more criteria, and modify the first tuning event and the second tuning event based on the third tuning event, and audience measurement circuitry to analyze edited tuning data to measure audience viewing behaviors, the edited tuning data including the first modified tuning event, the second modified tuning event, and the third tuning event.

Example 2 includes the apparatus of example 1, further including data preprocessing circuitry to calculate a play delay for the first tuning event based on a difference between a view start time of the first tuning event and a credit start time of the first tuning event, the view start time corresponding to a beginning of a presentation of the first tuning event, the credit start time corresponding to a beginning of a broadcast of the first tuning event, and classify the first tuning event as live viewing or time-shifted viewing based on whether the play delay satisfies a threshold.

Example 3 includes the apparatus of example 2, further including data processing circuitry to discard the first tuning event based on one or more determinations that at least one of (i) the view start time equals a view end time, the view end time corresponding to an end of presentation of the tuning event, (ii) the view start time follows the view end time, (iii) the credit start time follows a credit end time, the credit end time corresponding to an end of the broadcast of the tuning event, or (iv) the play delay is less than zero and does not satisfy a second threshold.

Example 4 includes the apparatus of example 1, wherein the time conflict includes a view time conflict between the first tuning event and the second tuning event, and the view conflict resolution circuitry is to determine whether the view time conflict exists based on (i) a view start time of the first tuning event preceding a view end time of the second tuning event, (ii) a view end time of the first tuning event following a view start time of the second tuning event, and (iii) an identification of the first tuning event not matching an identification of the second tuning event.

Example 5 includes the apparatus of example 1, wherein the time conflict includes a credit time conflict between the first tuning event and the second tuning event, and further including credit conflict resolution circuitry to determine whether the credit time conflict exists based on (i) a station code of the first tuning event matching a station code of the second tuning, (ii) the second tuning event occurring consecutive to the first tuning event, and (iii) a time gap between a view end time of the first tuning event and a view start time of the second tuning event satisfying a threshold.

Example 6 includes the apparatus of example 1, further including geographic location determination circuitry to determine whether an error exists corresponding to a geographic location assignment of the presentation device, the error including at least one of no designated market area assigned to the presentation device or multiple designated market areas assigned to the presentation device, and in response to determining the error exists, assign a first designated market area to the presentation device based on at least one of tuning data corresponding to local affiliate stations or a probability distribution of designated market areas for monitored households.

Example 7 includes an apparatus to edit tuning data collected via automated content recognition, the apparatus comprising at least one memory, machine readable instructions, and processor circuitry to at least one of instantiate or execute the machine readable instructions to detect whether a time conflict exists between first tuning data corresponding to a first tuning event and second tuning data corresponding to a second tuning event, the first tuning data and the second tuning data collected by a presentation device via automated content recognition, the time conflict including a period of overlap associated with the first tuning event and the second tuning event, in response to detecting that the time conflict exists, generate a third tuning event based on the first tuning data or the second tuning data, the third tuning event generated based on one or more criteria, adjust the first tuning event and the second tuning event based on the third tuning event, and evaluate edited tuning data to measure audience viewing behaviors, the edited tuning data including the first adjusted tuning event, the second adjusted tuning event, and the third tuning event.

Example 8 includes the apparatus of example 7, wherein the processor circuitry is to determine a play delay for the first tuning event based on a difference between a view start time of the first tuning event and a credit start time of the first tuning event, the view start time corresponding to a beginning of a presentation of the first tuning event, the credit start time corresponding to a beginning of a broadcast of the first tuning event, and categorize the first tuning event as live viewing or time-shifted viewing based on whether the play delay satisfies a threshold.

Example 9 includes the apparatus of example 8, wherein the processor circuitry is to remove the first tuning event based on one or more determinations that at least one of (i) the view start time equals a view end time, the view end time corresponding to an end of presentation of the tuning event, (ii) the view start time follows the view end time, (iii) the credit start time follows a credit end time, the credit end time corresponding to an end of the broadcast of the tuning event, or (iv) the play delay is less than zero and does not satisfy a second threshold.

Example 10 includes the apparatus of example 7, wherein the time conflict includes a view time conflict between the first tuning event and the second tuning event, and the processor circuitry is to detect whether the view time conflict exists based on (i) a view start time of the first tuning event preceding a view end time of the second tuning event, (ii) a view end time of the first tuning event following a view start time of the second tuning event, and (iii) an identification of the first tuning event not matching an identification of the second tuning event.

Example 11 includes the apparatus of example 7, wherein the time conflict includes a credit time conflict between the first tuning event and the second tuning event, and the processor circuitry to determine whether the credit time conflict exists based on (i) a station code of the first tuning event matching a station code of the second tuning, (ii) the second tuning event occurring consecutive to the first tuning event, and (iii) a time gap between a view end time of the first tuning event and a view start time of the second tuning event satisfying a threshold.

Example 12 includes the apparatus of example 7, wherein the processor circuitry is to detect whether an error exists corresponding to a geographic location assignment of the presentation device, the error including at least one of no designated market area assigned to the presentation device or multiple designated market areas assigned to the presentation device, and in response to detecting the error exists, designate a first designated market area to the presentation device based on at least one of tuning data corresponding to local affiliate stations or a probability distribution of designated market areas for monitored households.

Example 13 includes a non-transitory machine readable storage medium comprising instructions that, when executed, cause processor circuitry to at least discern whether a time conflict exists between first tuning data corresponding to a first tuning event and second tuning data corresponding to a second tuning event, the first tuning data and the second tuning data collected by a presentation device via automated content recognition, the time conflict including a period of overlap associated with the first tuning event and the second tuning event, in response to discerning that the time conflict exists, produce a third tuning event based on the first tuning data or the second tuning data, the third tuning event produced based on one or more criteria, alter the first tuning event and the second tuning event based on the third tuning event, and assess edited tuning data to measure audience viewing behaviors, the edited tuning data including the first altered tuning event, the second altered tuning event, and the third tuning event.

Example 14 includes the non-transitory machine readable storage medium of example 13, wherein the instructions further cause the processor circuitry to compute a play delay for the first tuning event based on a difference between a view start time of the first tuning event and a credit start time of the first tuning event, the view start time corresponding to a beginning of a presentation of the first tuning event, the credit start time corresponding to a beginning of a broadcast of the first tuning event, and label the first tuning event as live viewing or time-shifted viewing based on whether the play delay satisfies a threshold.

Example 15 includes the non-transitory machine readable storage medium of example 14, wherein the instructions cause the processor circuitry to delete the first tuning event based on one or more determinations that at least one of (i) the view start time equals a view end time, the view end time corresponding to an end of presentation of the tuning event, (ii) the view start time follows the view end time, (iii) the credit start time follows a credit end time, the credit end time corresponding to an end of the broadcast of the tuning event, or (iv) the play delay is less than zero and does not satisfy a second threshold.

Example 16 includes the non-transitory machine readable storage medium of example 13, wherein the time conflict includes a view time conflict between the first tuning event and the second tuning event, and the instructions cause the processor circuitry to discern whether the view time conflict exists based on (i) a view start time of the first tuning event preceding a view end time of the second tuning event, (ii) a view end time of the first tuning event following a view start time of the second tuning event, and (iii) an identification of the first tuning event not matching an identification of the second tuning event.

Example 17 includes the non-transitory machine readable storage medium of example 13, wherein the time conflict includes a credit time conflict between the first tuning event and the second tuning event, and the instructions cause the processor circuitry to determine whether the credit time conflict exists based on (i) a station code of the first tuning event matching a station code of the second tuning, (ii) the second tuning event occurring consecutive to the first tuning event, and (iii) a time gap between a view end time of the first tuning event and a view start time of the second tuning event satisfying a threshold.

Example 18 includes the non-transitory machine readable storage medium of example 13, wherein the instructions cause the processor circuitry to discern whether an error exists corresponding to a geographic location assignment of the presentation device, the error including at least one of no designated market area assigned to the presentation device or multiple designated market areas assigned to the presentation device, and in response to discerning the error exists, allocate a first designated market area to the presentation device based on at least one of tuning data corresponding to local affiliate stations or a probability distribution of designated market areas for monitored households.

Example 19 includes an apparatus comprising means for resolving a time conflict between a first tuning event and a second tuning event, the means for resolving to determine whether the time conflict exists between first tuning data corresponding to the first tuning event and second tuning data corresponding to the second tuning event, the first tuning data and the second tuning data collected by a presentation device via automated content recognition, the time conflict including a period of overlap associated with the first tuning event and the second tuning event, the means for resolving to, in response to determining that the time conflict exists, create a third tuning event based on the first tuning data or the second tuning data, the third tuning event created based on one or more criteria, the means for resolving to modify the first tuning event and the second tuning event based on the third tuning event, and means for analyzing edited tuning data to measure audience viewing behaviors, the edited tuning data including the first modified tuning event, the second modified tuning event, and the third tuning event.

Example 20 includes the apparatus of example 19, further including means for preprocessing the first tuning data, the means for preprocessing to calculate a play delay for the first tuning event based on a difference between a view start time of the first tuning event and a credit start time of the first tuning event, the view start time corresponding to a beginning of a presentation of the first tuning event, the credit start time corresponding to a beginning of a broadcast of the first tuning event, and classify the first tuning event as live viewing or time-shifted viewing based on whether the play delay satisfies a threshold.

Example 21 includes the apparatus of example 20, further including means for processing the first tuning data, the means for processing to discard the first tuning event based on one or more determinations that at least one of (i) the view start time equals a view end time, the view end time corresponding to an end of presentation of the tuning event, (ii) the view start time follows the view end time, (iii) the credit start time follows a credit end time, the credit end time corresponding to an end of the broadcast of the tuning event, or (iv) the play delay is less than zero and does not satisfy a second threshold.

Example 22 includes the apparatus of example 19, wherein the time conflict includes a view time conflict between the first tuning event and the second tuning event, the means for resolving to determine whether the view time conflict exists based on (i) a view start time of the first tuning event preceding a view end time of the second tuning event, (ii) a view end time of the first tuning event following a view start time of the second tuning event, and (iii) an identification of the first tuning event not matching an identification of the second tuning event.

Example 23 includes the apparatus of example 19, wherein the time conflict includes a credit time conflict between the first tuning event and the second tuning event, the means for resolving to determine whether the credit time conflict exists based on (i) a station code of the first tuning event matching a station code of the second tuning, (ii) the second tuning event occurring consecutive to the first tuning event, and (iii) a time gap between a view end time of the first tuning event and a view start time of the second tuning event satisfying a threshold.

Example 24 includes the apparatus of example 19, further including means for determining a geographic location of the presentation device, the means for determining the geographic location to determine whether an error exists corresponding to a geographic location assignment of the presentation device, the error including at least one of no designated market area assigned to the presentation device or multiple designated market areas assigned to the presentation device, and in response to determining the error exists, assign a first designated market area to the presentation device based on at least one of tuning data corresponding to local affiliate stations or a probability distribution of designated market areas for monitored households.

Example 25 includes a method for editing tuning data collected via automated content recognition, the method comprising determining whether a time conflict exists between first tuning data corresponding to a first tuning event and second tuning data corresponding to a second tuning event, the first tuning data and the second tuning data collected by a presentation device via automated content recognition, the time conflict including a period of overlap associated with the first tuning event and the second tuning event, in response to determining that the time conflict exists, creating a third tuning event based on the first tuning data, the second tuning data, and one or more criteria, modifying at least one of the first tuning event or the second tuning event based on the third tuning event, and crediting a media presentation by the presentation device based on edited tuning data, the edited tuning data including the first modified tuning event, the second modified tuning event, and the third tuning event.

Example 26 includes the method of example 25, wherein the crediting of the media presentation includes crediting a portion of the media presentation associated with the third tuning event based on the first tuning data of the first tuning event or the second tuning data of the second tuning event.

Example 27 includes the method of example 25, further including calculating a play delay for the first tuning event based on a difference between a view start time of the first tuning event and a credit start time of the first tuning event, the view start time corresponding to a beginning of a presentation of the first tuning event, the credit start time corresponding to a beginning of a broadcast of the first tuning event, and classifying the first tuning event as live viewing or time-shifted viewing based on whether the play delay satisfies a threshold.

Example 28 includes the method of example 27, wherein the calculating of the play delay includes discarding the first tuning event based on determining that at least one of (i) the view start time equals a view end time, the view end time corresponding to an end of presentation of the tuning event, (ii) the view start time follows the view end time, (iii) the credit start time follows a credit end time, the credit end time corresponding to an end of the broadcast of the tuning event, or (iv) the play delay is less than zero and does not satisfy a second threshold.

Example 29 includes the method of example 28, wherein the time conflict includes a view time conflict between the first tuning event and the second tuning event, and further including determining whether the view time conflict exists based on (i) a view start time of the first tuning event preceding a view end time of the second tuning event, (ii) a view end time of the first tuning event following a view start time of the second tuning event, and (iii) an identification of the first tuning event not matching an identification of the second tuning event.

Example 30 includes the method of example 29, wherein the time conflict includes a credit time conflict between the first tuning event and the second tuning event, and further including determining whether the credit time conflict exists based on (i) a station code of the first tuning event matching a station code of the second tuning, (ii) the second tuning event occurring consecutive to the first tuning event, and (iii) a time gap between a view end time of the first tuning event and a view start time of the second tuning event satisfying a threshold.

Example 31 includes the method of example 30, further including determining whether an error exists corresponding to a geographic location assignment of the presentation device, the error including at least one of no designated market area assigned to the presentation device or multiple designated market areas assigned to the presentation device, and in response to determining the error exists, assigning a first designated market area to the presentation device based on at least one of tuning data corresponding to local affiliate stations or a probability distribution of designated market areas for monitored households.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A method for editing tuning data collected via automated content recognition, the method comprising:
determining whether a time conflict exists between first tuning data corresponding to a first tuning event and second tuning data corresponding to a second tuning event, the first tuning data and the second tuning data collected by a presentation device via automated content recognition, the time conflict including a period of overlap associated with the first tuning event and the second tuning event;
in response to determining that the time conflict exists, creating a third tuning event based on the first tuning data, the second tuning data, and one or more criteria;
modifying at least one of the first tuning event or the second tuning event based on the third tuning event; and
crediting a media presentation by the presentation device based on edited tuning data, the edited tuning data including the first modified tuning event, the second modified tuning event, and the third tuning event.

2. The method of claim 1, wherein the crediting of the media presentation includes crediting a portion of the media presentation associated with the third tuning event based on the first tuning data of the first tuning event or the second tuning data of the second tuning event.

3. The method of claim 1, further including:
calculating a play delay for the first tuning event based on a difference between a view start time of the first tuning event and a credit start time of the first tuning event, the view start time corresponding to a beginning of a presentation of the first tuning event, the credit start time corresponding to a beginning of a broadcast of the first tuning event; and
classifying the first tuning event as live viewing or time-shifted viewing based on whether the play delay satisfies a threshold.

4. The method of claim 3, wherein the calculating of the play delay includes discarding the first tuning event based on determining that at least one of (i) the view start time equals a view end time, the view end time corresponding to an end of presentation of the tuning event, (ii) the view start time follows the view end time, (iii) the credit start time follows a credit end time, the credit end time corresponding to an end of the broadcast of the tuning event, or (iv) the play delay is less than zero and does not satisfy a second threshold.

5. The method of claim 4, wherein the time conflict includes a view time conflict between the first tuning event and the second tuning event, and further including determining whether the view time conflict exists based on (i) a view start time of the first tuning event preceding a view end time of the second tuning event, (ii) a view end time of the first tuning event following a view start time of the second tuning event, and (iii) an identification of the first tuning event not matching an identification of the second tuning event.

6. The method of claim 5, wherein the time conflict includes a credit time conflict between the first tuning event and the second tuning event, and further including determining whether the credit time conflict exists based on (i) a station code of the first tuning event matching a station code of the second tuning, (ii) the second tuning event occurring consecutive to the first tuning event, and (iii) a time gap between a view end time of the first tuning event and a view start time of the second tuning event satisfying a threshold.

7. The method of claim 6, further including:
determining whether an error exists corresponding to a geographic location assignment of the presentation device, the error including at least one of no designated market area assigned to the presentation device or multiple designated market areas assigned to the presentation device; and
in response to determining the error exists, assigning a first designated market area to the presentation device based on at least one of tuning data corresponding to local affiliate stations or a probability distribution of designated market areas for monitored households.

8. The method of claim 1, wherein the media presentation includes streaming content.

9. A computing system comprising:
a processor; and
a non-transitory computer-readable storage medium, having stored thereon program instructions that, upon execution by the processor, cause performance of a set of operations comprising:
detecting that a view conflict exists between first tuning data corresponding to a first tuning event and second tuning data corresponding to a second tuning event, the first tuning data and the second tuning data collected by a presentation device via automated content recognition ("ACR");
adjusting the first tuning event and the second tuning event based on a third tuning event; and
evaluating edited tuning data to measure audience viewing behaviors, the edited tuning data including the first adjusted tuning event, the second adjusted tuning event, and the third tuning event.

10. The computing system of claim 9, wherein the set of operations further comprises:
determining a play delay for the first tuning event based on a difference between a view start time of the first tuning event and a credit start time of the first tuning event, the view start time corresponding to a beginning of a presentation of the first tuning event, the credit start time corresponding to a beginning of a broadcast of the first tuning event; and
labeling the first tuning event as live viewing or time-shifted viewing based on whether the play delay satisfies a threshold.

11. The computing system of claim 10, wherein the set of operations further comprises:
deleting the first tuning event based on one or more determinations that at least one of (i) the view start time equals a view end time, the view end time corresponding to an end of presentation of the tuning event, (ii) the view start time follows the view end time, (iii) the credit start time follows a credit end time, the credit end time corresponding to an end of the broadcast of the tuning event, or (iv) the play delay is less than zero and does not satisfy a second threshold.

12. The computing system of claim 9, wherein the set of operations further comprises:
detecting whether the view conflict exists based on (i) a view start time of the first tuning event preceding a view end time of the second tuning event, (ii) a view end time of the first tuning event following a view start time of the second tuning event, and (iii) an identification of the first tuning event not matching an identification of the second tuning event.

13. The computing system of claim 9, wherein the view conflict is associated with a remote activity including at least one of a play activity, a pause activity, or a seek activity.

14. The computing system of claim 9, wherein the presentation device is at least one of a streaming device, a gaming console, or other ACR-enabled device connected to a television, projector, monitor, or other display device.

15. A non-transitory computer-readable storage medium, having stored thereon program instructions that, upon execution by a processor, cause performance of a set of operations comprising:
detecting that a view conflict exists between first tuning data corresponding to a first tuning event and second tuning data corresponding to a second tuning event, the first tuning data and the second tuning data collected by a presentation device via automated content recognition ("ACR");
adjusting the first tuning event and the second tuning event based on a third tuning event; and
evaluating edited tuning data to measure audience viewing behaviors, the edited tuning data including the first adjusted tuning event, the second adjusted tuning event, and the third tuning event.

16. The non-transitory computer-readable storage medium of claim 15, wherein the set of operations further comprises:
determining a play delay for the first tuning event based on a difference between a view start time of the first tuning event and a credit start time of the first tuning event, the view start time corresponding to a beginning of a presentation of the first tuning event, the credit start time corresponding to a beginning of a broadcast of the first tuning event; and
labeling the first tuning event as live viewing or time-shifted viewing based on whether the play delay satisfies a threshold.

17. The non-transitory computer-readable storage medium of claim 16, wherein the set of operations further comprises:
deleting the first tuning event based on one or more determinations that at least one of (i) the view start time equals a view end time, the view end time corresponding to an end of presentation of the tuning event, (ii) the view start time follows the view end time, (iii) the credit start time follows a credit end time, the credit end time corresponding to an end of the broadcast of the tuning event, or (iv) the play delay is less than zero and does not satisfy a second threshold.

18. The non-transitory computer-readable storage medium of claim 15, wherein the set of operations further comprises:
detecting whether the view conflict exists based on (i) a view start time of the first tuning event preceding a view end time of the second tuning event, (ii) a view end time of the first tuning event following a view start time of the second tuning event, and (iii) an identification of the first tuning event not matching an identification of the second tuning event.

19. The non-transitory computer-readable storage medium of claim 15, wherein the view conflict is associated with a remote activity including at least one of a play activity, a pause activity, or a seek activity.

20. The non-transitory computer-readable storage medium of claim 15, wherein the presentation device is at least one of a streaming device, a gaming console, or other ACR-enabled device connected to a television, projector, monitor, or other display device.

* * * * *